(12) United States Patent
Kikkoji et al.

(10) Patent No.: US 8,073,382 B2
(45) Date of Patent: Dec. 6, 2011

(54) COMMUNICATION DEVICE, COMMUNICATE METHOD FOR COMMUNICATION DEVICE, AND COMMUNICATION PROGRAM FOR COMMUNICATION DEVICE

(75) Inventors: Hiroyuki Kikkoji, Tokyo (JP); Nozomu Okuzawa, Tokyo (JP); Shinsuke Yamashita, Kanagawa (JP); Jun Moriya, Tokyo (JP); Yasuhiro Murase, Tokyo (JP)

(73) Assignee: Sony Corporation, Tokyo (JP)

( * ) Notice: Subject to any disclaimer, the term of this patent is extended or adjusted under 35 U.S.C. 154(b) by 922 days.

(21) Appl. No.: 10/564,317

(22) PCT Filed: May 18, 2004

(86) PCT No.: PCT/JP2004/007016
§ 371 (c)(1),
(2), (4) Date: Jan. 12, 2006

(87) PCT Pub. No.: WO2005/006229
PCT Pub. Date: Jan. 20, 2005

(65) Prior Publication Data
US 2006/0179306 A1    Aug. 10, 2006

(30) Foreign Application Priority Data

| Jul. 14, 2003 | (JP) | ................................. 2003-274302 |
| Aug. 11, 2003 | (JP) | ................................. 2003-291741 |
| Sep. 4, 2003 | (JP) | ................................. 2003-313167 |
| Sep. 30, 2003 | (JP) | ................................. 2003-341331 |

(51) Int. Cl.
*H04H 40/00* (2008.01)
*H04M 1/66* (2006.01)

(52) U.S. Cl. ...................................... 455/3.06; 455/411

(58) Field of Classification Search ............... 455/414.1, 455/414.3, 435.1, 3.03–3.06, 411, 154.1, 455/158.5; 725/22, 142, 47, 48, 59–61, 109, 725/62, 63, 68, 78, 40, 43, 46, 51; 709/219
See application file for complete search history.

(56) References Cited

U.S. PATENT DOCUMENTS 6,507,727 B1 * 1/2003 Henrick ....................... 455/3.06
(Continued)

FOREIGN PATENT DOCUMENTS

JP    2000-222360    8/2000
(Continued)

OTHER PUBLICATIONS

U.S. Appl. No. 10/526,902, filed Aug. 16, 2005, Yamashita et al.
(Continued)

*Primary Examiner* — George Eng
*Assistant Examiner* — Nam Huynh
(74) *Attorney, Agent, or Firm* — Oblon, Spivak, McClelland, Maier & Neustadt, L.L.P.

(57) ABSTRACT

A processing unit detects whether externally input user personal information has been stored in a storage medium. A network interface transmits a transmission of available/unavailable request information identifying a broadcast station that broadcast received broadcast information, if the externally input user personal information has not been stored in the storage medium. The network interface receives available/unavailable information in a reply to the transmission. The available/unavailable information shows whether an external device offers a service providing related information about contents included in the received broadcast information. The network interface transmits the externally input user personal information to the external device to request a user registration in accordance with the available/unavailable information, if the processing unit detects that the externally input user personal information is not stored in the storage medium. The network interface transmits request information that requests the related information about the contents.

14 Claims, 15 Drawing Sheets

U.S. PATENT DOCUMENTS

| | | | |
|---|---|---|---|
| 7,047,041 B2* | 5/2006 | Vanska et al. | 455/558 |
| 7,623,824 B2* | 11/2009 | Anttila et al. | 455/3.06 |
| 2002/0102954 A1* | 8/2002 | Kaneko | 455/142 |
| 2002/0174431 A1* | 11/2002 | Bowman et al. | 725/47 |
| 2003/0093545 A1* | 5/2003 | Liu et al. | 709/231 |
| 2004/0078274 A1* | 4/2004 | Aarnio | 705/26 |
| 2004/0203406 A1* | 10/2004 | Moran et al. | 455/66.1 |
| 2004/0203655 A1* | 10/2004 | Sinnarajah et al. | 455/414.1 |
| 2005/0060701 A1 | 3/2005 | Murase | |
| 2005/0091679 A1 | 4/2005 | Tanaka et al. | |

FOREIGN PATENT DOCUMENTS

| | | |
|---|---|---|
| JP | 2001-125914 | 5/2001 |
| JP | 2002-120672 | 4/2002 |
| JP | 2003-108565 | 4/2003 |
| JP | 2003-162601 | 6/2003 |
| JP | 2003-169352 | 6/2003 |

OTHER PUBLICATIONS

U.S. Appl. No. 10/554,542, filed Oct. 25, 2005, Iwatsu et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kokkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.

* cited by examiner

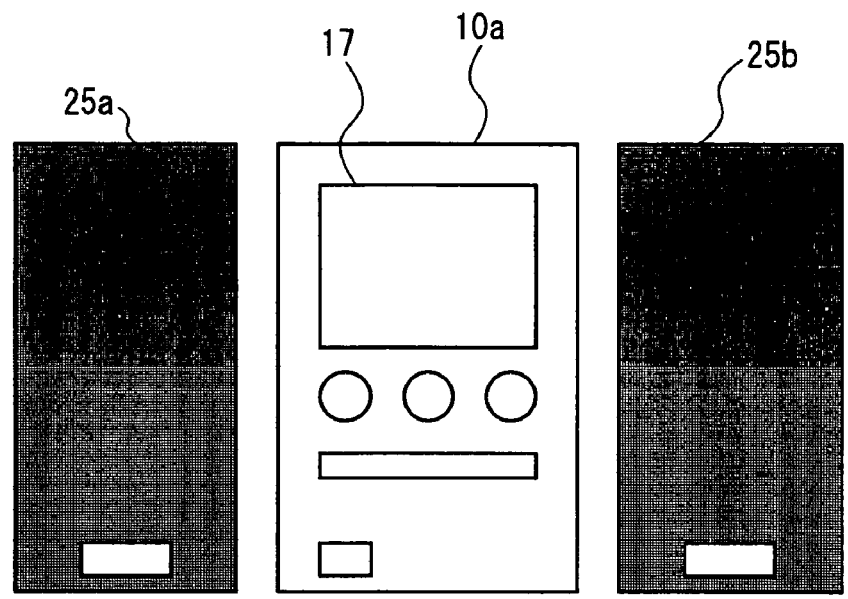
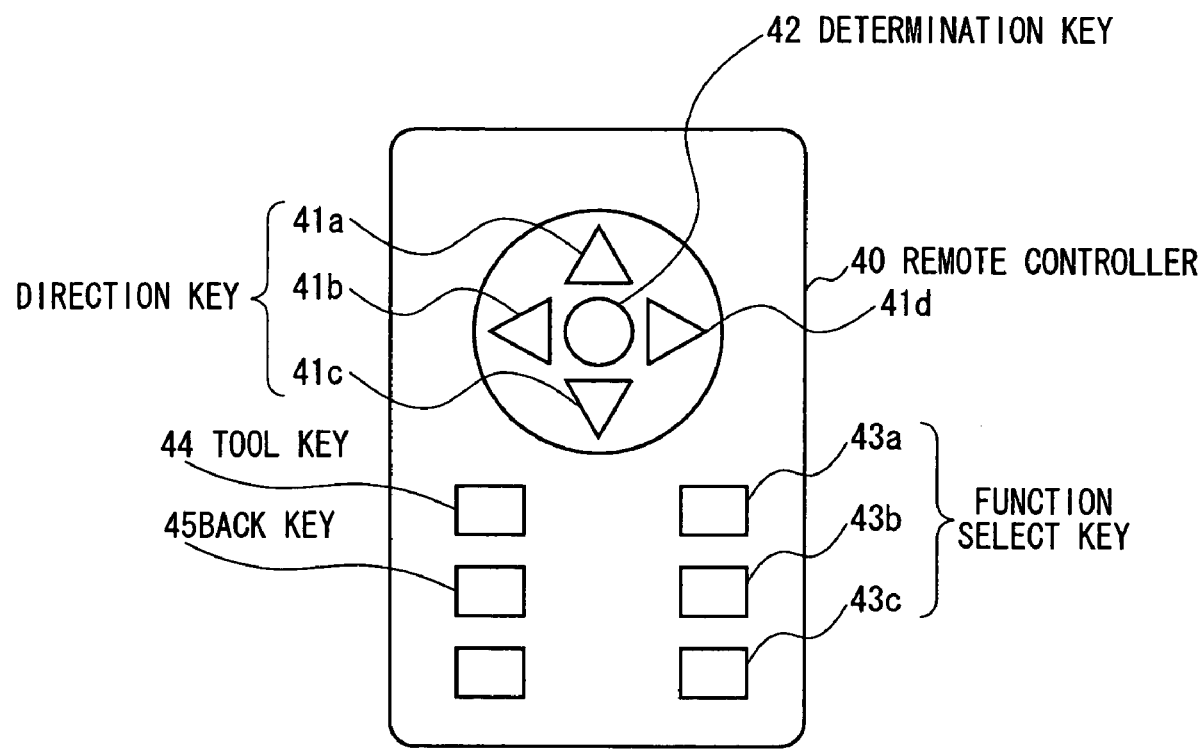
FIG. 3

COMMUNICATION DEVICE, COMMUNICATE METHOD FOR COMMUNICATION DEVICE, AND COMMUNICATION PROGRAM FOR COMMUNICATION DEVICE

TECHNICAL FIELD

The present invention relates to a communication apparatus, a communication method in a communication apparatus, and a communication program for a communication apparatus, and more particularly relates to a communication apparatus for receiving/providing related information about contents, a communication method in the communication apparatus, and a communication program for the communication apparatus.

BACKGROUND ART

At present, radio stations provide information peculiar to each station to listeners on the Internet. Concretely, they provide related information about a musical composition (now-on-air) such as the title and the player's name of the musical composition being broadcasted now in a program, and the title and the product number of a compact disc (CD) in that the musical composition is recorded, on the Internet.

There is a service transmitting the now-on-air to consumer electronics (CE) equipment having a display (for example, audio equipment) via the Network for display. If the listener is pleased with a musical composition being broadcasted, he/she can get information about the musical composition by watching the now-on-air displayed on the display of the CE equipment.

To receive this service with the CE equipment, the listener has to be a member of the service provider that provides the now-on-air. Then, it is required that when the listener who is not a member is receiving radio broadcasting, a guide for entry that if the listener enters, the listener can watch now-on-air is made.

Note that, in a digital ground broadcast transmitting/receiving system for transmitting ground wave broadcasting by one or more broadcasting stations in that the MPEG2 system is applied to a broadcast signal, there is a digital ground broadcasting transmitting/receiving system that can reduce the redundancy of transmission data and can broadcast further mass information by that each broadcasting station adds a network ID to each transmission master being a unit of broadcasting having the same broadcasting contents (for example, see Patent Document 1)

Patent Document 1—Japanese patent laid-open No. 2002-57640 (page 6, FIG. 1).

By the way, depending on an external device, being a broadcasting station for example, also there is an external device that does not provide related information about contents being now-on-air. Therefore, there has been a problem that there is a case where although the listener entered by the guide of entry, the listener cannot receive related information about desired contents.

DESCRIPTION OF THE INVENTION

Considering the above points, the present invention has been done and aims to provide a communication apparatus that enables the user to receive related information about contents being offered by requesting information showing whether or not related information about contents is offered to an external device, a communication method in the communication apparatus, and a communication program for the communication apparatus.

To solve the above problem, according to the present invention, in a communication apparatus for receiving related information about contents, a communication apparatus which includes transmission means for transmitting user personal information to an external device that provides related information about contents included in broadcast information being received, in order to request user registration, storing means for storing the user personal information in a storage medium, detection means, when in making an access request to the external device, for detecting whether or not the user personal information has been stored in the storage medium, and transmission means for transmitting related information request information that requests related information about contents, in accordance with the detection result by the detection means, and notifies information concerning a service providing related information about contents to be offered by an external device, is provided.

According to such communication apparatus, user personal information that was transmitted when user registration was made in an external device for providing related information about contents is stored in a storage medium. Then, when in making an access request to the external device, whether or not the user personal information has been stored in the storage medium is detected. In accordance with the detection result, related information request information that requests related information about contents is transmitted, or in accordance with the detection result, information concerning a service providing related information about contents being offered by an external device is notified.

In a communication apparatus of this invention, yes/no of user registration by the user is determined by detecting whether or not the user personal information has been stored in a storage medium. In accordance with the detection result, related information request information that requests related information about contents is transmitted, or in accordance with the detection result, information concerning a service providing related information about contents being offered by an external device is notified.

Thereby, if the user has not been made user registration, information concerning a service providing related information about contents that is offered by an external device is notified, and an entry guide may be displayed based on this information. Thus, the user can receive related information about contents being offered.

BRIEF DESCRIPTION OF THE DRAWINGS

FIG. 3 is a diagram showing an appearance of a terminal unit.

BEST MODE FOR CARRYING-OUT OF THE INVENTION (1) Basic Principle of this Invention The principle of the present invention will be described in detail with reference to the accompanying drawings. As shown in FIG. 1, a communication apparatus 1 has transmission means 1a, storage means 1b, storage medium 1c, detection means 1d and transmission selecting means 1e. The communication apparatus 1 is connected to an external device 2 via a network. The external device 2 performs radio or cable broadcasting, and provides related information about contents included in broadcast information being broadcasted, on the network. Note that, the external device 2 may be separately provided from an apparatus for performing radio or cable broadcasting.

Figure 1:
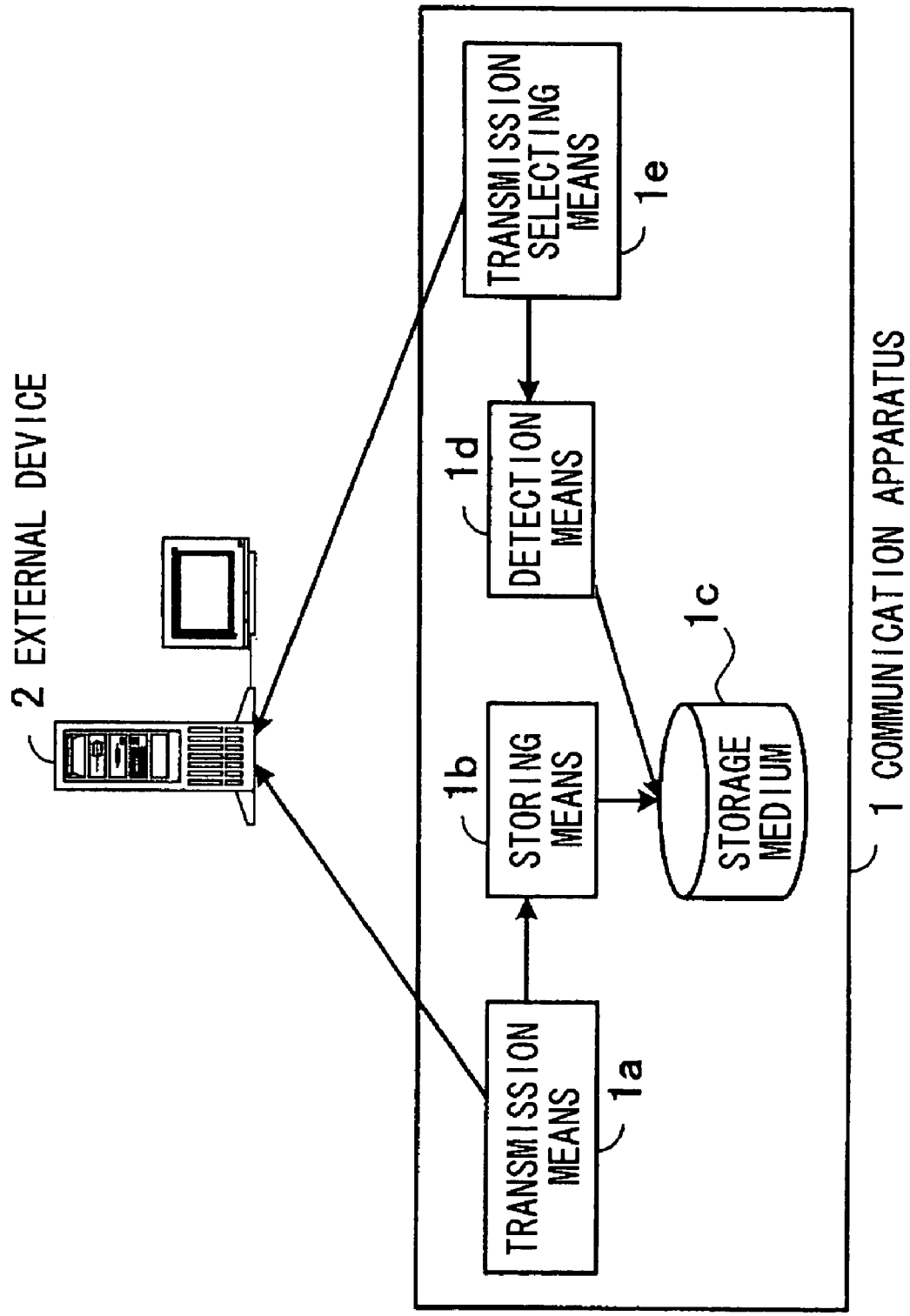
FIG. 1 is a principle diagram for explaining the principle of the present invention.

The transmission means 1a in the communication apparatus 1 transmits user personal information in order to request user registration to the external device 2 that provides related information about contents included in the broadcast information being received. The storage means 1b stores the user personal information transmitted to the external device 2 in the storage medium 1c.

The detection means 1d detects whether or not the user personal information has been stored in the storage medium 1c, when in making an access request to the external device 2. The transmission selecting means 1e selectively transmits either one of related information request information that requests related information about contents, and available/unavailable request information that requests information showing whether or not the external device 2 offers a service providing related information about contents, in accordance with the detection result by the detection means 1d. If the user personal information transmitted to the external device 2 has been stored in the storage medium 1c, the transmission selecting means 1e transmits the related information request information that requests related information about contents to the external device 2. If the user personal information has not been stored in the storage medium 1c, the transmission selecting means 1e transmits the available/unavailable request information that requests information showing whether or not the external device 2 offers the service providing related information about contents to the external device 2.

If receiving the related information request information, the external device 2 transmits related information about contents included in the broadcast information being broadcasted to the communication apparatus 1. On the other hand, if receiving the available/unavailable request information, the external unit 2 transmits information showing whether or not the service providing related information about contents included in the broadcast information being broadcasted offers to the communication apparatus 1.

Operation in the principle diagram will be described. The communication apparatus 1 accepts an input of information necessary for user registration from the user. The communication apparatus 1 transmits user personal information to the external device 2 that provides the related information about contents included in the broadcast information being received, in order to request user registration. The storage means 1b stores the user personal information transmitted to the external device 2 in the storage medium 1c. That is, if user registration in the external device 2 is performed by the user, the user personal information is stored in the storage medium 1c.

When in making an access request to the external device 2, the detection means 1d detects whether or not the user personal information transmitted to the external device 2 has been stored in the storage medium 1c. The transmission selecting means 1e selectively transmits either one of the related information request information that requests related information about contents, and the available/unavailable request information that requests information showing whether or not the external device 2 offers a service providing related information about contents, in accordance with the detection result by the detection means 1d.

In this manner, the user personal information is stored in the storage medium 1c when user registration is performed, and whether or not the user has done user registration is determined by detecting whether or not the user personal information has been stored in the storage medium 1c. Then, either one of the related information request information that requests related information about contents, and the available/unavailable request information that requests information showing whether or not the external device offers a service providing related information about contents is selectively transmitted, in accordance with the detection result. Thereby, if the user has not done user registration, the available/unavailable request information is transmitted to the external device 2, so that information that whether or not the service providing related information about contents offers is received. An entry guide can be displayed based on this, and the user can receive related information about contents being offered.

(2) First Embodiment (2-1) Configuration of Network System

A first embodiment of the present invention will be described in detail with reference to the accompanying drawings. Hereinafter, processing for saving information about a musical composition or a group of musical compositions in a secondary memory unit is referred to as "clip". And also, the information saved by the clip is referred to as "clip information".

Figure 2:
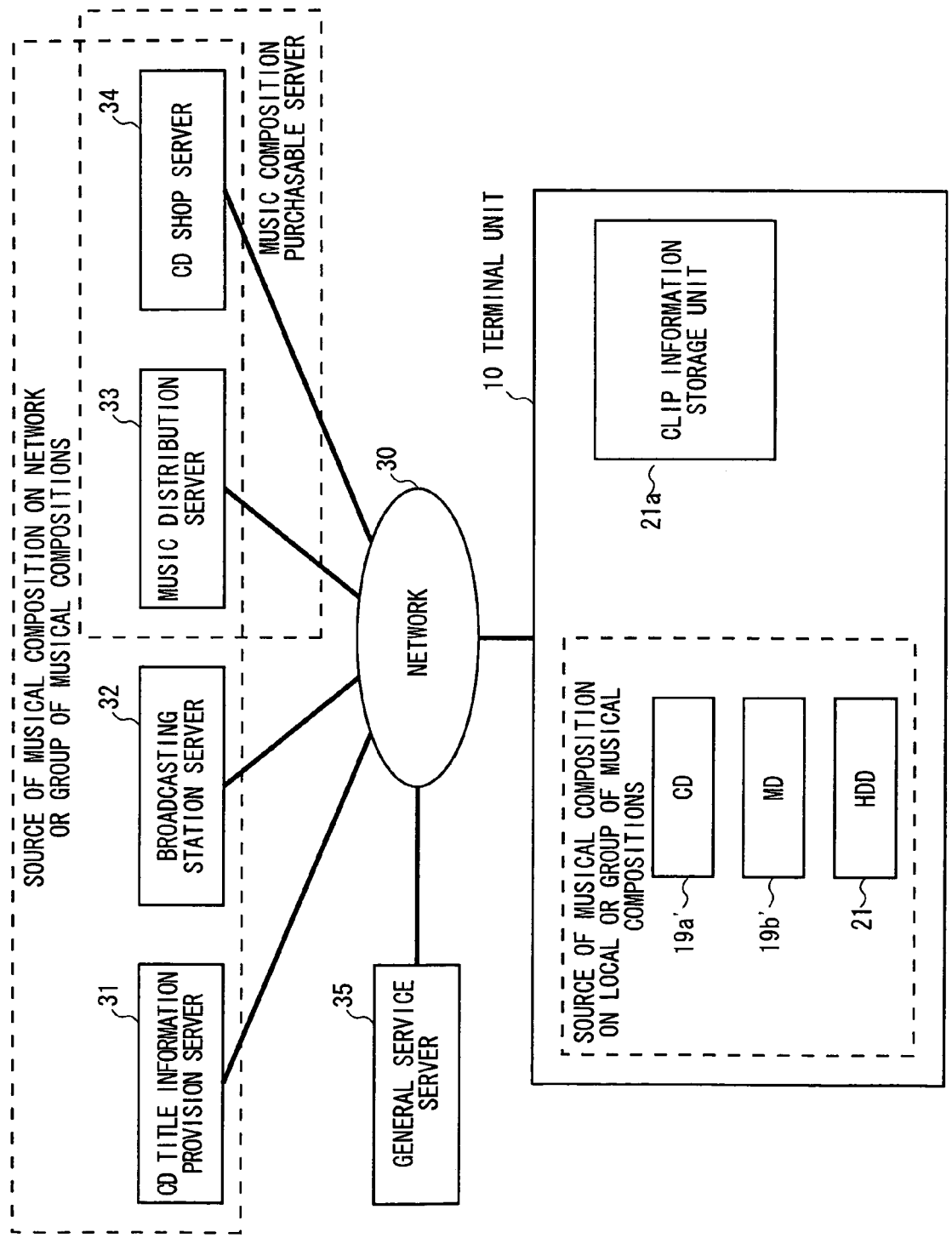
FIG. 2 is a diagram showing a network system according to a first embodiment of the present invention.

FIG. 2 is a diagram showing a network system according to the first embodiment of the present invention. A terminal unit 10 is connected to various servers via a network 30. The network 30 is for example the Internet. As the servers, there are a CD title information provision server 31, a broadcasting station server 32, a music distribution server 33, a CD shop server 34, and the like.

The CD title information provision server 31 performs a distribution service of related information about a musical composition recorded in a CD being on sale. The broadcasting station server 32 is a server managed by a broadcasting station of FM broadcasting, television (TV) broadcasting or the like, and performs a provision service of related information about a musical composition to be broadcasted. Note that, if roughly classifying the function to provide related information offered by the broadcasting station server 32, they are classified into two as follows. The first function is a function to provide now-on-air being broadcasted now. The second function is a function to provide related information about musical compositions that were already broadcasted (on-air list) in accordance with a request from the terminal unit 10. For instance, the broadcasting station server 32 provides related information about the musical compositions that were broadcasted in a specified program, or provides related information about the musical compositions that were broadcasted within a specified time zone.

The music distribution server 33 is a server that performs a service distributing digital data about a musical composition (musical composition data). For example, the music distribution server 33 provides musical composition data only to the terminal unit 10 of the user's who did the purchase procedure of the musical composition. Furthermore, the music distribution server 33 can provide related information about a musical composition to be distributed.

The CD shop server 34 is a server for performing the acceptance of orders or the like for mail order of CDs. The CD shop server 34 also performs a distribution service of audio data for demonstration or the like, and a provision service of related information about musical compositions recorded in CDs being on sale.

As the above, plural servers perform the provision service of information concerning a musical composition or a group of musical compositions on the network 30. That is, each server functions as the source of a musical composition or a group of musical compositions on the network 30.

Note that, the music distribution server 33 and the CD shop server 34 are musical composition purchasable servers, and has a function to sell audio data about a musical composition or audio data about a group of musical compositions by on-line. If the user accesses the musical composition purchasable server by operating the terminal unit 10, the user can practically purchase a musical composition or a group of musical compositions via the network 30. By performing a purchase procedure to the music distribution server 33, the user of the terminal unit 10 can download audio data from the music distribution server 33. Furthermore, by performing a purchase procedure to the CD shop server 34, the user of the terminal unit 10 can have the shop deliver a CD or the like to his/her house.

The terminal unit 10 stores the source of a musical composition or a group of musical compositions on a local network in a recording medium such as a CD 29*a*, a Mini Disc (MD) 29*b*, and a hard disk drive (HDD) 21. These sources are different depending on the type and the purpose of the terminal unit 10.

Note that, the source of the musical composition or the group of musical compositions on the local network shown in FIG. 2 is an example. That is, provided that it is a recording medium existing on a local network of the terminal unit 10, by recording a musical composition or a group of musical compositions in it, the recording medium can be functioned as the source of the musical composition or the group of musical compositions on the local network.

On the other hand, the terminal unit 10 has a clip information storage unit 21*a* for storing clipped related information. The clip information storage unit 21*a* is a secondary storage unit in the terminal unit 10. For example, a part of the memory area in the HDD 21 or the like can be functioned as the clip information storage unit 21*a*. Note that, the terminal unit 10 can perform clipping to both of a musical composition and a group of musical compositions. Therefore, as to an FM program including many interesting musical compositions, a CD album, or the like, additional information about the group of interesting musical compositions can be stored by one clip operation, by clipping it whole.

The terminal unit 10 finds the call sign of a radio broadcasting station being listened, based on the frequency of the radio broadcasting that the user is listening and the area where the user is listening. Furthermore, the terminal unit 10 determines whether or not the listener is contracting with a provider that manages a general service server 35 (has done the user registration). The terminal unit 10 stores data about call signs that correspond to the frequency of radio broadcasting and the listening area, and finds the call sign of the radio broadcasting station that the user is listening by referring to this data. Furthermore, if the user does user registration, the terminal unit 10 stores a part of information about the user registration. The terminal unit 10 determines whether or not the user is contracting by referring to this information.

If it is determined that the listener has done the user registration, the terminal unit 10 transmits the found call sign and a request signal that requests to transmit now-on-air provided by the radio broadcasting station of that call sign to the general service server 35. If it is determined that the listener has not been done user registration, the terminal unit 10 transmits the found call sign and a request signal that requests to transmit information whether or not the radio broadcasting station of that call sign offers now-on-air, to the general service server 35.

The general service server 35 integrates services being provided by various servers, and distributes them to the terminal unit 10. The user of the terminal unit 10 can receive the distribution of contents being offered by the various servers from the general service server 35, for example, by contracting with a provider that manages the general service server 35. Concretely, the general service server 35 transmits a ticket enabling the user to access the server that distributes contents requested by the user, to the terminal unit 10 used by the user. The terminal unit 10 transmits the ticket to the various servers, and receives the contents. The various servers recognize that the user is a person authenticated from the general service server 35, by that an appropriate ticket was transmitted from the terminal unit 10, and distributes the contents to the terminal unit 10.

Further, the general service server 35 receives the call sign and a request signal that requests to transmit now-on-air from the terminal unit 10, via the network 30. The general service server 35 specifies the radio broadcasting station being listened by the user, from the received call sign, in accordance with the received request signal. The general service server 35 transmits a ticket enabling the terminal unit 10 to access the server of the specified radio broadcasting station and to receive the now-on-air, to the terminal unit 10 via the network 30.

Furthermore, the general service server 35 receives the call sign and a request signal that requests to transmit the information whether or not the now-on-air is offered, from the terminal unit 10, via the network 30. The general service server 35 specifies the radio broadcasting station being listened by the user, from the received call sign, in accordance with the received request signal, and determines whether or not the specified radio broadcasting station offers the now-on-air. The general service server 35 transmits the determination result to the terminal unit 10, via the network 30.

If receiving the ticket from the general service server 35, the terminal unit 10 accesses the server based on the received ticket, and receives the now-on-air. If receiving the result that the radio broadcasting station being listened now by the user is a radio broadcasting station offering the now-on-air from the general service server 35, the terminal unit 10 displays an entry guide to the provider on the display. If receiving the result that the radio broadcasting station being listened now by the user is listening now is a radio broadcasting station not offering the now-on-air, the entry guide to the provider is not displayed on the display.

As the above, in the case where the listener does not contract with the provider, if the listener listens to radio broadcasting whether or not the radio broadcasting station offers now-on-air is determined, and an entry guide is given. Thereby, the now-on-air of a desired program can be provided to the listener.

(2-2) Configuration of Terminal Unit

By the way, the terminal unit 10 in this embodiment is combined with a function as audio equipment having a function to reproduce a musical composition. FIG. 3 is a diagram showing the appearance of the terminal unit. As shown in FIG. 3, the terminal unit 10 according to this embodiment has an appearance similar to, a typical system component. The terminal unit 10 is composed of a main body of unit 10a, speakers 25a, 25b, and a remote controller 40. In the main body of unit 10a, a function to play a CD, a function to record/play an MD, and a function to receive FM broadcasting and TV broadcasting are provided. An audio signal generated in the main body of unit 10a is transmitted to the speakers 25a, 25b, so that a sound is emitted from the speakers 25a, 25b.

Further, in the main body of unit 10a, a display 17 is provided. On the display 17, music information about a musical composition being reproduced, clip information saved by clipping, or the like is displayed. The remote controller 40 is an input unit for remotely operating the main body of unit 10a. On the remote controller 40, plural operation keys are provided. If an operation key is depressed by the user, a signal corresponding to the depressed operation key is transmitted from the remote controller 40 to the main body of unit 10a, by radio communication means such as infrared rays.

As the operation keys, there are direction keys 41a-41d, a determination key 42, function select keys 43a-43c, a tool key 44, a back key 45, and the like. The direction keys 41a-41d will be used to move a cursor displayed on the display 17 and a position to be focused, for example. The four direction keys 41a-41d respectively correspond to each direction of up, down, left and right, and the cursor or the like is moved into a direction that corresponds to the depressed direction key.

The determination key 42 will be used to determine the contents displayed on the display 17, for example. The function select keys 43a-43c will be used to select a function. For example, the three function select keys 43a-43c are respectively corresponded to an additional function, a tuner function, and a function to manage local contents. If one of the function select keys is depressed, the main body of unit 10a gets into the operation mode of the function that corresponds to the depressed function select key.

The tool key 44 is a button to display a tool menu on the display 17. In the tool menu, commands which correspond to the contents being displayed on the display device 17 are displayed. The user selects an arbitrary command by operating the direction key 41a-41d, and further depresses the determination key 42. Thereby, processing corresponding to the selected command is executed in the main body of unit 10a.

The back key 45 is a button to return the display contents on the display 17 to the state immediately before. Note that, in the remote controller 40, various operation keys can be provided other than the keys shown in FIG. 3. For example, they are a volume control key, a play key of a CD, and a stop key, and the like.

Figure 4:
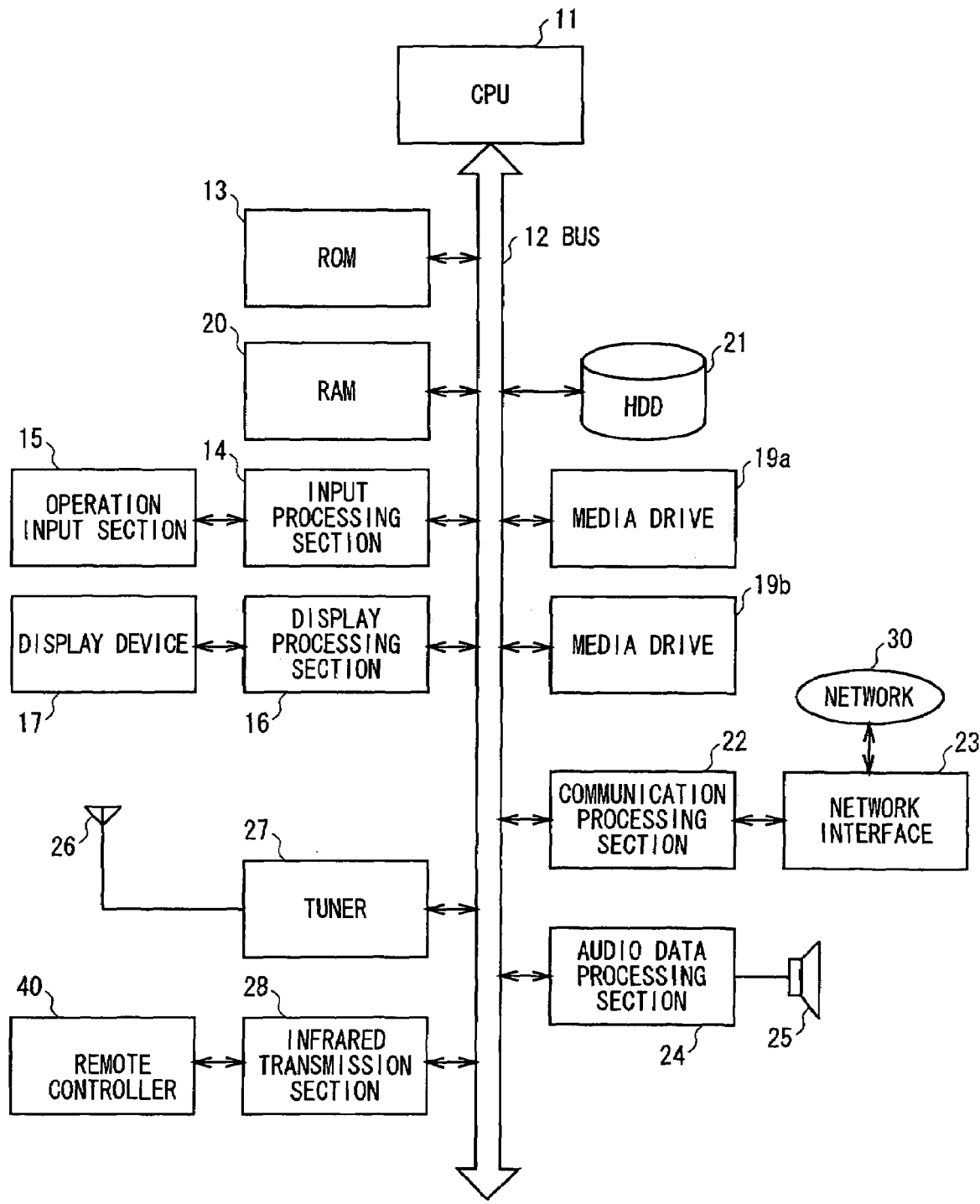
FIG. 4 is a block diagram showing the hardware configuration of the terminal unit.

Next, the internal configuration of the terminal unit 10 will be described. FIG. 4 is a block diagram showing the hardware configuration of the terminal unit. By such terminal unit 10 as shown in FIG. 4, various sources of musical compositions or the like can be managed, recorded and reproduced.

The CPU 11 performs the entire control and operation processing of the terminal unit 10, based on a program that was started. For example, the CPU 11 performs communication operation via the network 30, input/output operation to the user, reproducing of contents from media and clipping, storing contents in the HDD 21 and management for it, and information search via the network 30 based on clip information or the like. Note that, the contents data which can be recorded/reproduced by the terminal unit 10 of this embodiment is audio contents data and motion picture contents data. The CPU 11 transmits/receives a control signal and data to/from each circuit section via a bus 12.

In a read only memory (ROM) 13, an operating program to be executed by the CPU 11, a program loader, various coefficients of operation, parameters used in a program, and the like are stored. In a random access memory (RAM) 20, a program to be executed by the CPU 11 is expanded. Further, they are also used as a data area and a task area that are needed when the CPU 11 executes various processing. Furthermore, in the ROM 13, the call sign of each broadcasting station that corresponds to the frequency and the listening area has been stored. Note that, this information may be stored in the HDD 21.

The operation input section 15 has various operators such as operation keys, a jog dial, and a touch panel that are provided on the casing of the terminal unit 10. Note that, a keyboard and a mouse for graphical user interface (GUI) operation may be provided as the operation input section 15. Information inputted by the operation input section 15 is subjected to predetermined processing in an input processing section 14, and the resultant signal is transmitted to the CPU 11 as an operation command. The CPU 11 performs necessary operations and control so as to obtain operation as the equipment that responded to the inputted operation command.

As the display 17, for example, a display device such as a liquid crystal display is connected, and various information is displayed. If the CPU 11 supplies display data to a display processing section 16 in accordance with various operating states, input states, and communication states, the display processing section 16 makes the display unit 17 perform display operation based on the supplied display data. For example, on the display 17, the contents of related information distributed from a server or the like, and the contents of clip information is displayed. Further, the search of a musical composition via the network 30 is performed, and the search result is displayed on the display 17.

The media drives 19a, 19b are drives that can record/reproduce the contents of a musical composition or the like recorded in a portable recording medium (also there is a case of only reproducing depending on the recording medium). Note that, the kind of recording medium that can be recorded or reproduced by each of the media drives 19a, 19b is not limited to one. That is, recording and reproducing can be performed also to plural kinds of recording mediums. For example, it is possible that the media drive 19a performs reproducing of a CD, a digital versatile disc (DVD), and the media drive 19b performs recording and reproducing of an MD.

Note that, the portable recording medium to record the contents of a musical composition or the like should not be limited to an optical recording medium such as a CD and a DVD. For instance, contents can be stored also in a recording medium composed of a semiconductor memory such as a flash memory. In that case, a flash memory reader/writer is connected to the bus 12.

The user can view/listen to a musical composition or the like by inserting a recording medium (such as a CD, a DVD and an MD) in that arbitrary contents have been recorded into the media drive 19a, 19b, and performing a predetermined operation to the remote controller 40. For example, if the user operates the remote controller 40 to direct reproducing by the media drive 19a, the CPU 11 directs to reproduce contents to the media drive 19a. In response to this, the media drive 19a executes reading from the loaded recording medium, by accessing the specified contents.

If thus read contents are audio contents, the contents are subjected to decoding or the like by the processing of the CPU 11 as the occasion demands, and then the resultant signal is transmitted to an audio data processing section 24. In the audio data processing section 24, the signal is subjected to the processing of a sound field such as equalizing, volume control, and processing such as D/A conversion and amplification, and the resultant signal is outputted from a speaker section 25. Note that, the speaker section 25 is composed of such plural speakers 25a, 25b as shown in FIG. 4, and the sound can be emitted in stereo.

Further, the contents reproduced by the media drive 19a, 19b also can be stored in the HDD 21 as an audio data file by the control of the CPU 11. Note that, the format of this audio data file also may be set to digital audio data at a sampling frequency 44.1 KHz in 16 bit quantization in a CD format. To save the capacity of the HDD 21, the audio data file may be set to compressed audio data in the format that was subjected to compression processing according to a predetermined method. Further, also the compression method is not limited to this but also advanced transform acoustic coding (ATRAC, trademark) method, MPEG audio layer-3 (MP3) method can be adopted.

A tuner 27 is for example an AM/FM radio tuner, and demodulates a broadcast signal received by an antenna 26 based on the control of the CPU 11. Of course, the tuner may be a television tuner, a satellite broadcasting tuner, a digital broadcasting tuner, or the like. The demodulated broadcast audio signal is subjected to necessary processing in the audio data processing section 24, and the resultant signal is outputted from the speaker section 25 as a broadcast sound.

A communication processing section 22 performs encoding of send data and decoding of receive data based on the control of the CPU 11. A network interface 23 transmits send data encoded in the communication processing section 22 to predetermined equipment for the external network, via the network 30. Further, the network interface 23 transfers a signal transmitted from the equipment for the external network via the network to the communication processing section 22. The communication processing section 22 transfers the received data to the CPU 11. As the data received via the network 30, for example, there is related information about a program being broadcasted by FM or the like, and information about musical compositions that are included in the title of a CD or the like.

An infrared communication section 28 performs communication with the remote controller 40 by radio communication means such as infrared rays. Then, the infrared communication section 28 performs predetermined processing on a signal transmitted from the remote controller 40, and transmits thus obtained signal to the CPU 11 as an operation command. The CPU 11 performs necessary operations and control so that operation as equipment that responded to the inputted operation command can be obtained.

Note that, the configuration of the terminal unit 10 is not only limited to this configuration in FIG. 4 but it can be considered further variously. For example, an interface with peripheral equipment by a communication mode such as the universal serial bus (USB), the IEEE1394, and the Bluetooth may be provided. Then, also audio contents downloaded by the above network interface 23 via the network 30 and the audio contents transferred via an interface such as the above USB and IEEE1394 can be stored in the HDD 21. Further, a terminal which is used to connect a microphone and an external headphone, a video output terminal which can be used when in reproducing a DVD, a line connection terminal, an optical digital connection terminal, or the like may be provided. Furthermore, a PCMCIA slot, a memory card slot or the like may be formed so that data can be transmitted/received to/from an external information processing unit and audio equipment.

Next, the configuration of program modules in the system of this embodiment will be described. Note that, a program module is data in that processing to be executed by the terminal unit 10 is described, and a predetermined function can be realized by the terminal unit 10 based on the program module. In the explanation below, the function which is realized by executing the program module is called by the name of the program module.

Figure 5:
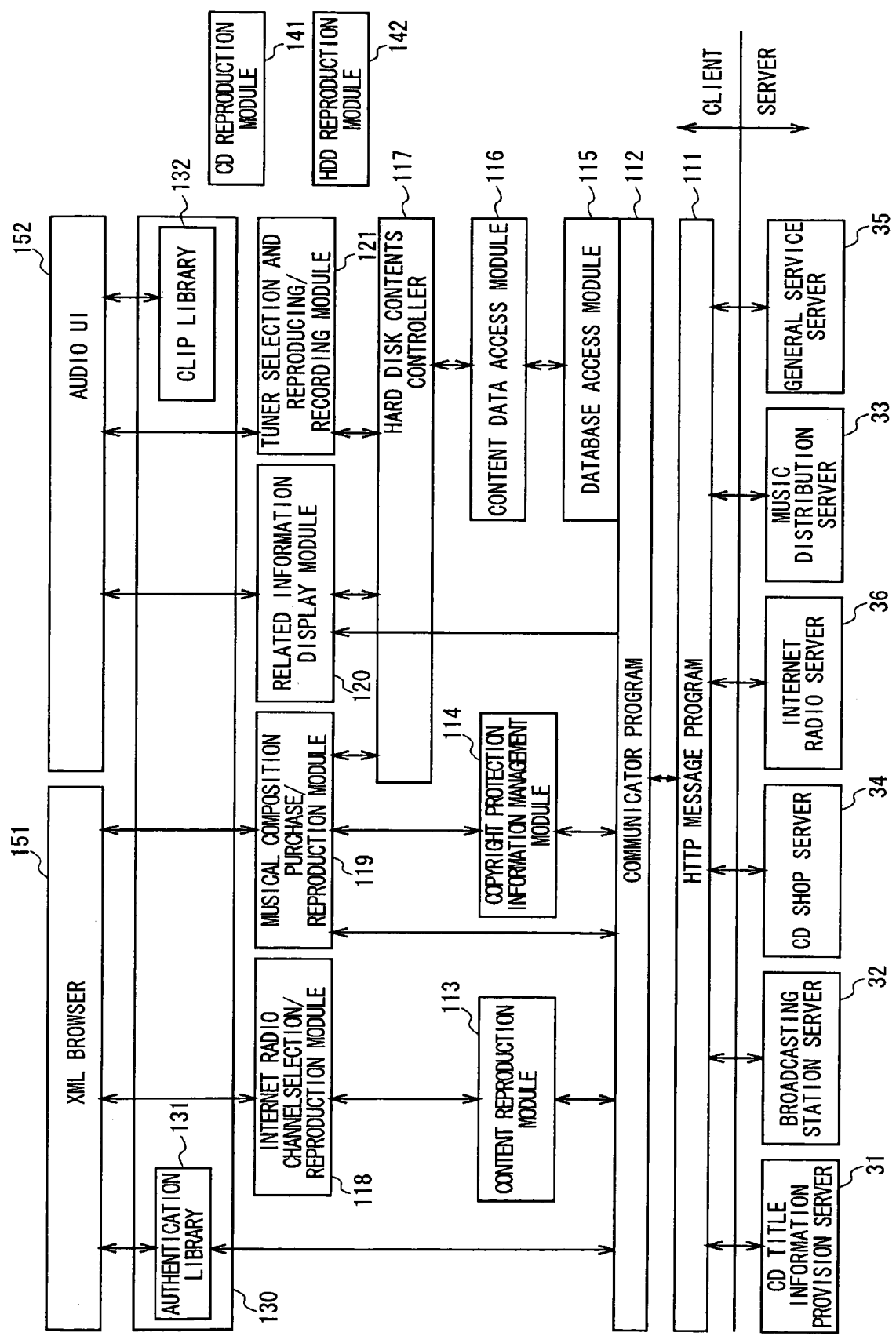
FIG. 5 is a diagram showing the configuration of program modules in the terminal unit.

FIG. 5 is a diagram showing the configuration of program modules in the terminal unit. As shown in FIG. 5, the program modules in the terminal unit 10 are formed so as to be operated on the OS (Operating System). The terminal unit 10 can perform communication with the CD title information provision server 31, the broadcasting station server 32, the music distribution server 33, the CD shop server 34 for selling CDs, the general service server 35, the Internet radio server 36, and various servers other than them, by the function of each program module.

A hypertext transfer protocol (HTTP) message program 111 is a program to perform communication with various servers such as the CD title information provision server 31, the broadcasting station server 32, the CD shop server 34, and the general service server 35, by HTTP communication. A communicator program 112 is a communication module to perform various communication with the general service server 35 or the like.

A contents reproducing module 113 for interpreting the codec of contents and reproducing the contents and a copyright protection information management module 114 for dealing information about copyright protection are in the position of the upper directories of the communicator program 112 (having a function close to a user interface). As the upper directory of the contents reproducing module 113, an Internet radio channel selection/reproducing module 118 for performing the channel selection and reproducing of the Internet radio is provided. As the upper directory of the copyright protection information management module 114, a musical composition purchase/reproducing module 119 for controlling purchase of a musical composition and reproducing of a tune for demonstration is provided.

As the upper directory of these Internet radio channel selection/reproducing module 118 and musical composition purchase/reproducing module 119, an extensible markup language (XML) browser 151 is provided. The XML browser 151 interprets the contents of an XML file transmitted from various servers, and performs visual display on the display 17. Further, the input contents that the user did to the terminal unit 10 when the terminal unit 10 is in a general service use mode are interpreted by the XML browser 151. Then, a processing request or the like according to the input contents is transmitted from the XML browser 151 to another module. For instance, a musical component selected by the user through the XML browser 151 is purchased by the musical composition purchase/reproducing module 119 and is written to the HDD 21 via a hard disk contents controller 117.

An authentication library 131 in a library 130 is connected to the communicator program 112. The authentication library 131 performs authentication processing of the general service server 35 and the other various servers.

As the upper directories of the communicator program 112, a database access module 115, a contents data access module 116 and the hard disk contents controller 117 are provided. The database access module 115 accesses various databases constructed in the HDD 21. The contents data access module 116 accesses contents stored in the HDD 21. The hard disk contents controller 117 manages the contents stored in the HDD 21.

As the upper directories of the hard disk contents controller 117, a related information display module 120, a tuner selection and reproducing/recording module 121 and the musical composition purchase/reproducing module 119 are provided. The related information display module 120 displays the title and the artist name of a musical composition broadcasted by a radio station on the display 17. The tuner selection and reproducing/recording module 121 selects the radio station and records the contents of the musical composition received from the above radio station on the HDD 21.

For instance, the musical composition received from the radio station that was selected through an audio user interface (Audio UI) 152 is written to the HDD 21 via the contents data access module 116.

The related information display module 120 receives the title and the artist name of the musical composition that is being broadcasted now by the radio station as related information by the tuner selection and reproducing/recording module 121, from the CD title information provision server 31, the broadcasting station server 32 or the like via the HTTP message program 111, and displays this on the display 17 via the audio user interface 152.

Note that, the related information displayed on the display 17 via the audio user interface 152 can be temporarily stored in a clip library 132 in the library 130. Further, the related information also can be finally stored in the HDD 21 via the database access module 115, according to a direction from the user.

Furthermore, as the program modules in the terminal unit 10, a CD reproducing module 141 for reproducing a CD, and an HDD reproducing module 142 for reproducing the HDD 21 are included. The reproducing result is outputted through the audio data processing section 24 and the speaker section 25.

In the terminal unit 10 having such configuration, related information can be obtained from a server, and the related information can be clipped. Note that, in addition to clip, also a search and purchase processing of a musical composition can be performed.

(2-3) Configuration of General Service Server

Next, the internal configuration of the general service server 35 will be described.

Figure 6:
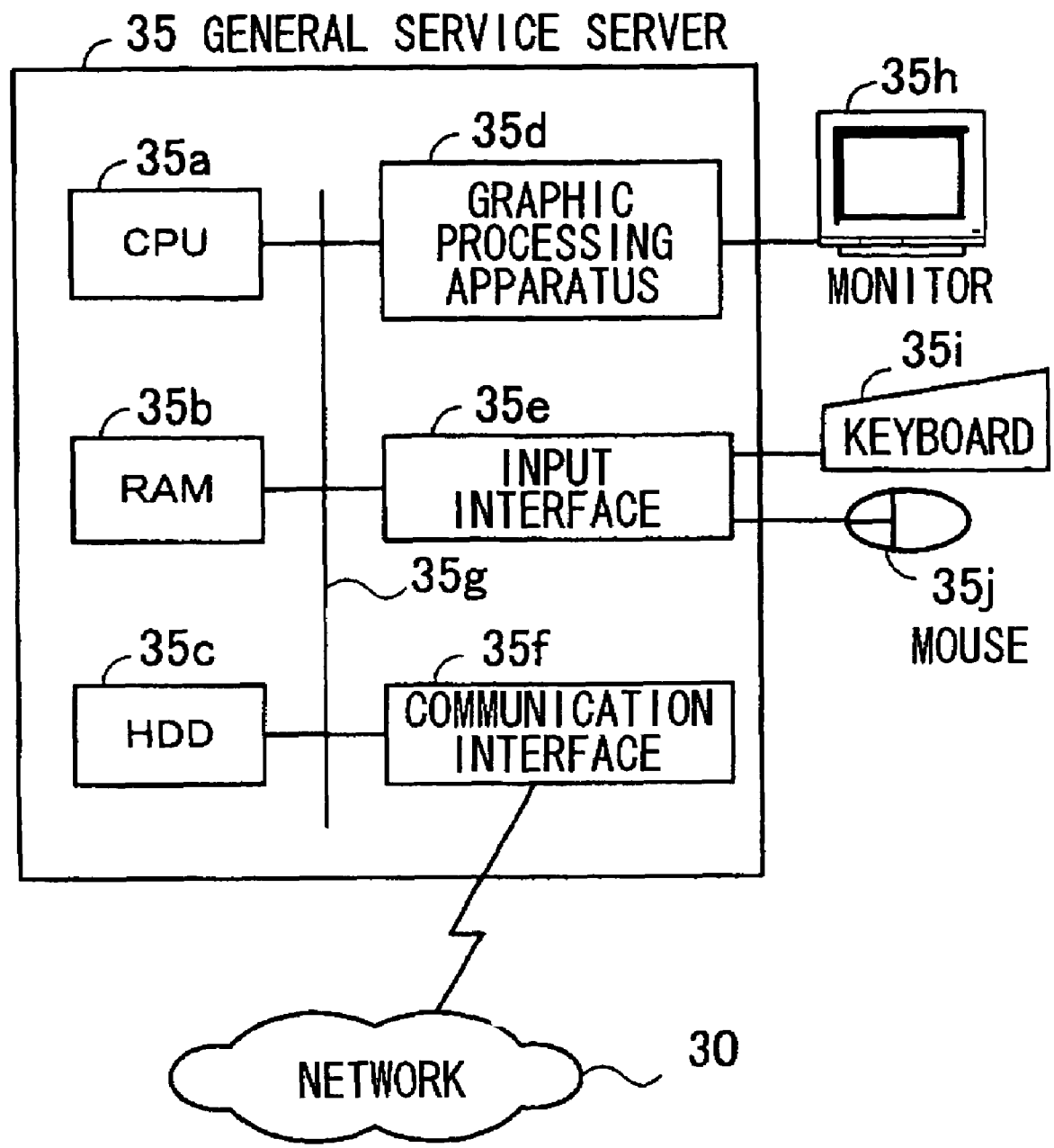
FIG. 6 is a diagram showing the hardware configuration of a general service server.

FIG. 6 is a hardware block diagram of the general service server 35. In the general service server 35 shown in FIG. 6, the whole system is controlled by a CPU 35a. A RAM 35b, a hard disk drive 35c, a graphic processing unit 35d, an input interface 35e and a communication interface 35f are connected to the CPU 35a, via a bus 35g.

In the RAM 35b, at least a part of an OS program to be executed by the CPU 35a and an application program for providing various services to the terminal unit 10 is temporarily stored. Further, in the RAM 35b, various data necessary for processing by the CPU 35a is stored. In an HDD 35c, the OS and an application program for providing data, or the like are stored.

A monitor 35h is connected to the graphic processing unit 35d. Pictures are displayed on the display screen of the monitor 35h according to a command from the CPU 35a, by the graphic processing unit 35d. A keyboard 35i and a mouse 35j are connected to the input interface 35e. The input interface 35e transmits a signal transmitted from the keyboard 35i and the mouse 35j to the CPU 35a, via the bus 35g.

The communication interface 35f is connected to the network 30. The communication interface 35f performs communication with the terminal unit 10, the various servers, via the network 30. By the above hardware configuration, the processing function of this embodiment can be realized. Note that, in FIG. 6, the hardware configuration of the general service server 35 is typically described. However, the other servers can be realized by a similar hardware configuration.

(2-4) User Registration Processing

Next, user registration in the general service server 35 will be described. To receive a service by various servers, the user has to make user registration in the general service server 35. The user enters customer information necessary for user registration from the terminal unit 10 to transmit this to the general service server 35, and obtains a user ID and a password. At this time, the user has to enter a terminal ID to the terminal unit 10. The terminal ID is an identifier to identify each terminal unit in the case where the user owns plural terminal units, and is arbitrary entered by the user. The terminal ID is transmitted to and is registered in the general service server 35 by the CPU 11, and also is stored in the ROM 13 or the HDD 21.

Figure 7:
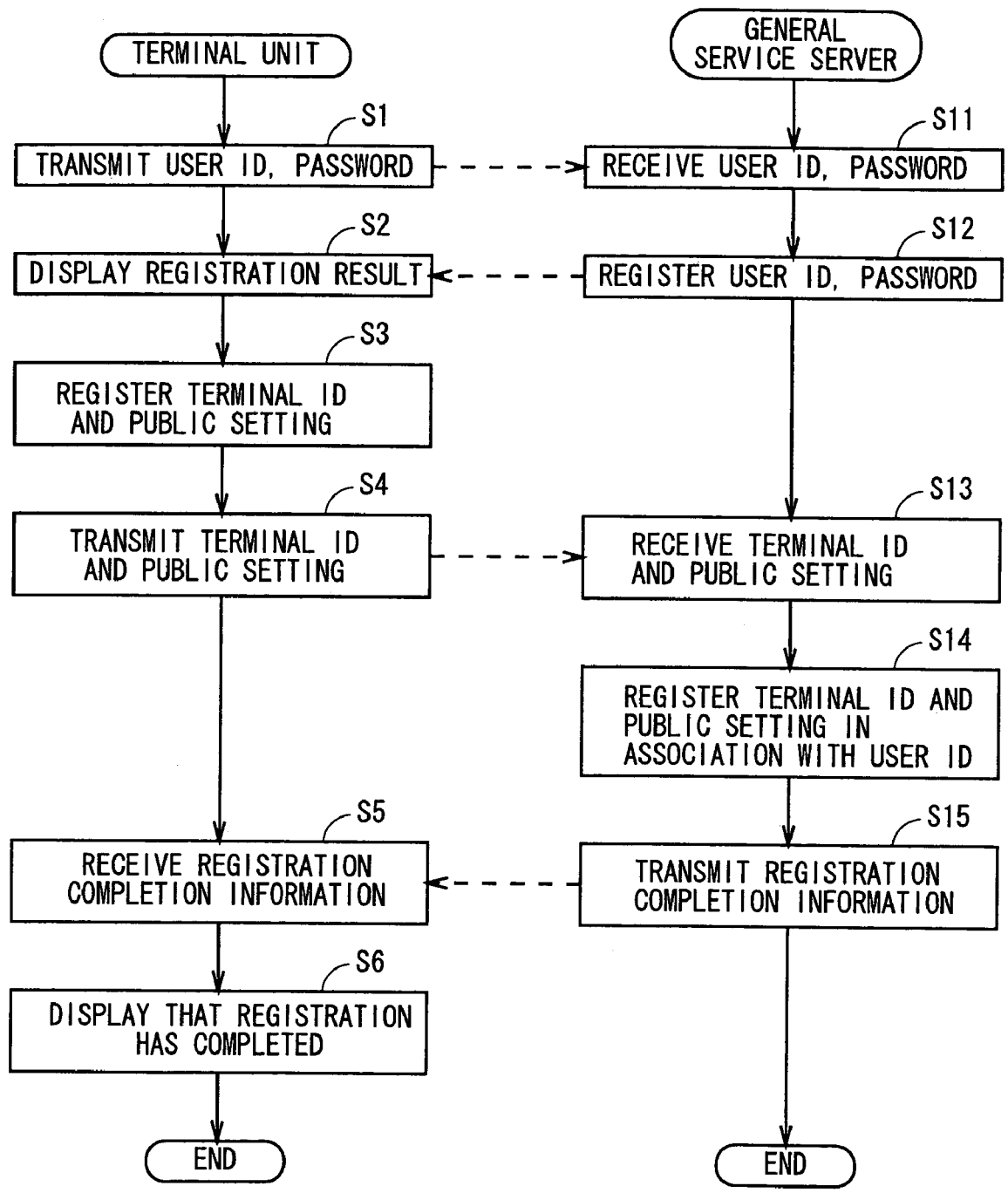
FIG. 7 is a sequence chart showing the flow of user registration processing.

The flow of the processing of user registration from the terminal unit 10 to the general service server 35 will be described with reference to a sequence chart. FIG. 7 is a sequence chart showing the flow of the processing of the user registration.

In step S1, to register the user ID and password entered by the user's operation, the CPU 11 of the terminal unit 10 transmits the above user ID and password to the general service server 35 as a part of registration information. Note that, in all communication between the terminal unit 10 and the general service server 35, the secure socket layer (SSL) is used. Thereby, leakage of information to a third party is prevented.

In step S11, the CPU 35a of the general service server 35 receives the user ID and password as a part of registration information. In step S12, the CPU 35a compares the received user ID and password with a management table in the hard disk drive 35c in that the information has been managed, confirms that an overlapped user ID does not exist, registers the above user ID, and transmits that the registration has completed to the terminal unit 10 as user registration completion information. Note that, if there is an overlapped user ID, the CPU 35a transmits a message to prompt the user to enter another user ID to the terminal unit 10, to make the user transmit the entered other user ID and password from the terminal unit 10.

In step S2, the CPU 11 of the terminal unit 10 displays that the registration of the user ID has completed on the display 17, in accordance with the received user registration completion information. In step S3, the CPU 11 stores the terminal ID and public setting in the HDD 21 of the terminal unit 10, based on a predetermined registration operation by the user. Note that, the public setting means the setting whether or not to open the presence of the above terminal unit 10 to the public to other users.

In step S4, the CPU 11 transmits the terminal ID and public setting to the general service server 35 as the rest of the registration information. In step S13, the CPU 35a of the general service server 35 receives the terminal ID and public setting as the rest of the registration information transmitted from the terminal unit 10.

In step S14, the CPU 35a registers the terminal ID and public setting in the management table in association with the user ID. In step S15, the CPU 35a transmits registration completion information showing that the registration of the terminal ID and public setting has completed to the terminal unit 10, and finishes the user registration processing on the general service server 35 side.

In step S5, the CPU 11 of the terminal unit 10 receives the registration completion information from the general service server 35. In step S6, the CPU 11 notifies the user of the completion of the user registration by displaying it on the display 17, and finishes the processing.

By the way, only one contracted user can use the terminal unit 10. To declare that the contracted user uses the terminal unit 10, when in accessing the server, it is necessary to enter the user ID, the password, and the terminal ID stored in the ROM 13 or the HDD 21.

The user ID and password inputted once have been stored in the RAM 20 by the CPU 11. Therefore, when the necessity of accessing again to the server occurred, the user ID and password stored in the RAM 20 are used again as long as they are stored without erasing by that the switch is turned off, for example. It saves the user entering. Since the terminal ID has been stored in the ROM 13 or the HDD 21, it is not erased.

For instance, it is assumed that to receive a service of now-on-air, the user makes user registration in the general service server 35. The CPU 11 accepts a user ID, a password and a terminal ID that are necessary for the user registration from the user, and transmits them to the general service server 35. At this time, the CPU 11 stores the accepted terminal ID in the ROM 13 or the HDD 21. And also the CPU 11 stores the accepted user ID and password in the RAM 20.

Note that, if a user authentication is made by the general service server 35, a ticket is issued to the user (the terminal unit 10). Thereby, the terminal unit 10 can access various servers that provide a service practically. The various servers determine whether or not the user of the terminal unit 10 was recently authenticated as a legal user (for example, within the past one minute), by referring to the authentication completion time included in the ticket, for example. If it is determined that the user has been authenticated, a service according to a request from the terminal unit 10 is performed.

(2-5) Display of Entry Guide and Receiving of Now-On-Air in Radio Broadcasting

Next, display of an entry guide and receiving of now-on-air in radio broadcasting will be described. For example, if listening of radio is selected by the user from the remote controller 40, the CPU 11 tunes the tuner 27 according to a command from the remote controller 40. At this time, the CPU 11 obtains a frequency tuned by the tuner 27. The CPU 11 obtains the call sign of the radio broadcasting station being listened by the user, based on the obtained frequency and for example, the listening area that was set and entered in presetting of a frequency after the terminal unit 10 was purchased. The CPU 11 obtains the call sign of the broadcasting station being listened by the user, by referring to the frequency and the call sign corresponding to the listening area stored in the ROM 13. The reason why the listening area is required to obtain a call sign in addition to the frequency is that radio stations different in area sometimes use the same frequency.

Note that, the listening area can be specified also by entering a zip code. For example, an area corresponding to a zip code has been stored in the ROM 13 or the HDD 21. Thereby, the listening area of the user is specified by the zip code entered by the user.

The CPU 11 retrieves the terminal ID from the ROM 13 or the HDD 21. If the terminal ID can be retrieved, that is, if user registration has been made in the general service server 35 by the terminal unit 10 being used by the user, the CPU 11 transmits a request signal to request now-on-air, the obtained call sign, user ID, password and terminal ID to the general service server 35 via the network 30.

The CPU 35a of the general service server 35 specifies the server of the radio broadcasting station being listened by the user, by receiving the request signal, based on the call sign received together with it. The CPU 35a transmits a ticket enabling the terminal unit 10 to access the server of the specified radio broadcasting station to the terminal unit 10.

The CPU 11 of the terminal unit 10 accesses the server that provides now-on-air based on the received ticket. The server which provides the now-on-air performs authentication of the ticket and transmits the requested now-on-air to the terminal unit 10. The CPU 11 of the terminal unit 10 displays the received now-on-air on the display 17.

If the terminal ID cannot be retrieved, that is, if the user has not been made user registration in the general service server 35 or if the user made the user registration but the user did not make the user registration in the general service server 35 by the terminal unit 10 that the user is using, the CPU 11 transmits the obtained call sign, and a request signal that requests information whether or not the radio broadcasting station of that call sign offers now-on-air, to the general service server 35.

The general service server 35 determines whether or not the radio broadcasting station being listened by the user offers now-on-air, by receiving the request signal, based on the call sign received together with it. The general service server 35 transmits the determination result to the terminal unit 10.

If receiving that the radio broadcasting station being listened by the user offers now-on-air, the CPU 11 of the terminal unit 10 displays an entry guide to recommend the user to enter the provider of the general service server 35 on the display 17. If receiving that the radio broadcasting station being listened by the user does not offer now-on-air, the CPU 11 of the terminal unit 10 does not display the entry guide on the display 17.

Next, operations on the general service server 35 side will be described. If receiving the call sign and a request signal that requests now-on-air from the terminal unit 10, that is, if receiving a request signal that requests now-on-air from the user who made user registration, the CPU 35*a* transmits a ticket for the server of the radio broadcasting station that corresponds to the call sign to the terminal unit 10.

If receiving the call sign and a request signal to request whether or not the radio broadcasting station corresponding to the call sign offers now-on-air from the terminal unit 10, that is, if receiving the call sign and the request signal from the user who has not been made user registration, the CPU 35*a* determines whether or not the radio broadcasting station corresponding to the call sign provides now-on-air, and transmits the determination result to the terminal unit 10. The determination whether or not the radio broadcasting station offers now-on-air is performed by that the CPU 35*a* refers to information that whether or not each radio broadcasting station previously stored in the HDD 35*c* offers now-on-air. Or, it is determined by accessing the server of the radio broadcasting station corresponding to the call sign.

Note that, if it is determined that the radio broadcasting station being listened by the user offers now-on-air, the general service server 35 may transmit the URL of an Web page to promote user registration to the terminal unit 10.

According to the above, the general service server 35 transmits the information about now-on-air or whether or not the radio broadcasting station offers now-on-air to the terminal unit 10, in accordance with the condition of the user registration by the user transmitted from the terminal unit 10. Thereby, in the terminal unit 10, an entry guide can be displayed on the display 17 according to the information from the general service server 35. The user can receive related information about contents being offered.

Figure 8:
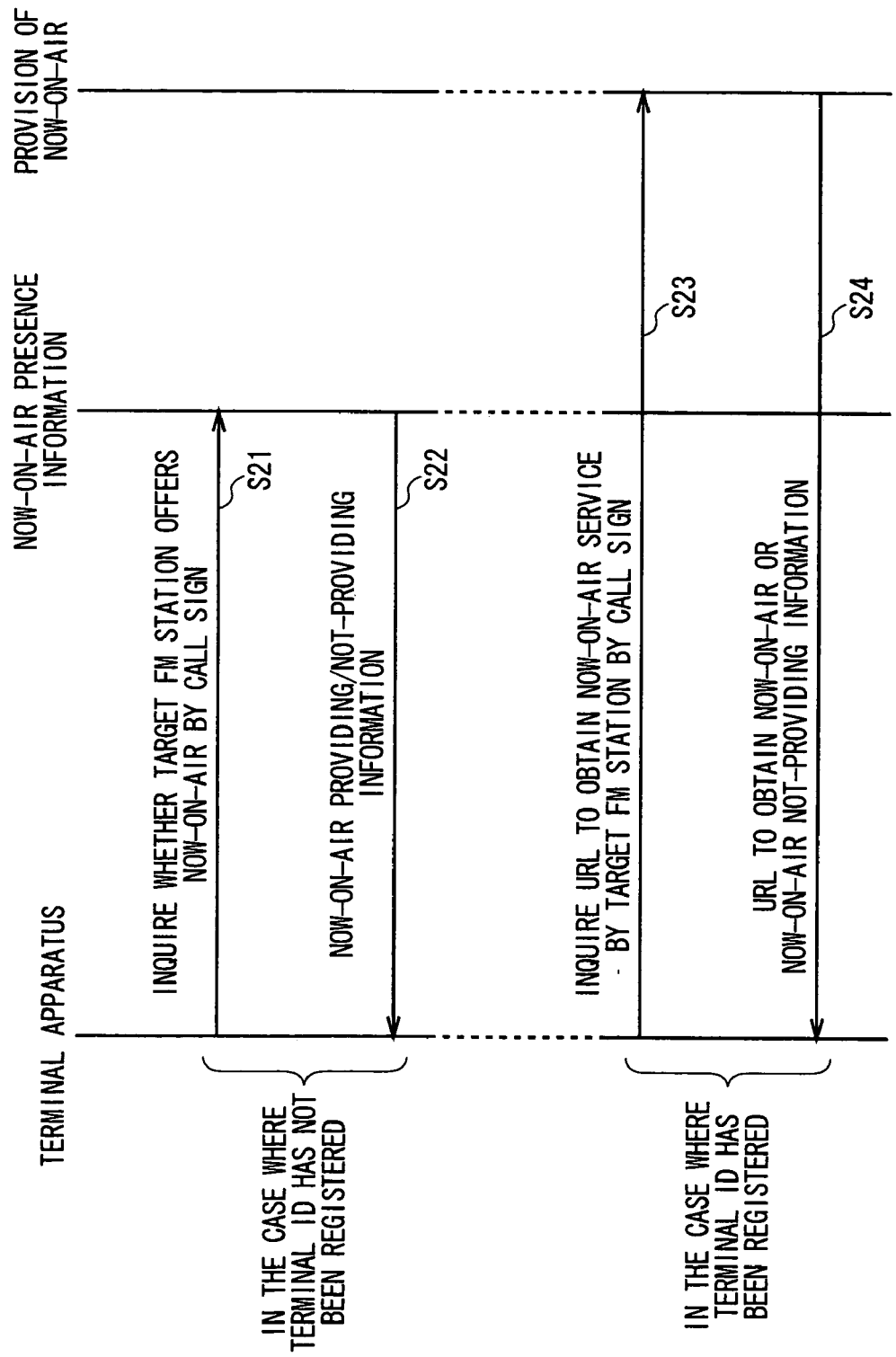
FIG. 8 is a sequence chart showing the flow of receiving of now-on-air in the case where the terminal unit determines yes/no of user registration.

Next, receiving of now-on-air in FM broadcasting in the case where the terminal unit 10 determines yes/no of user registration will be described with reference to a sequence chart. FIG. 8 is a sequence chart showing the flow of receiving of now-on-air in the case where a terminal unit determines yes/no of user registration.

First, the case where the terminal ID has not been stored in the HDD 21 of the terminal unit 10, that is, the case where the user has not been made user registration will be described. In step S21, the CPU 11 of the terminal unit 10 obtains the call sign of the FM station that the user is listening now. The CPU 11 inquires of the general service server 35 whether or not the target FM station (that the user is listening) offers now-on-air, by the obtained call sign.

In step S22, the CPU 35*a* of the general service server 35 determines whether or not the target FM station offers now-on-air, and transmits the result to the terminal unit 10. The CPU 11 of the terminal unit 10 receives the determination result about whether or not the target FM station offers now-on-air from the general service server 35. If the target FM station offers now-on-air, the CPU 11 displays an entry guide on the display 17, and if it does not offer now-on-air, the CPU 11 does not display the entry guide on the display 17.

Next, the case where the terminal ID has been stored in the HDD 21 of the terminal unit 10, that is, the case where the user has been made the user registration will be described. In step S23, the CPU 11 of the terminal unit 10 obtains the call sign of the FM broadcasting station that the user is listening from the ROM 13. The CPU 11 inquires of the general service server 35 the URL to obtain the now-on-air service by the target FM station.

In step S24, the CPU 35*a* of the general service server 35 obtains the URL of the target FM station by the call sign from the terminal unit 10, and transmits this to the terminal unit 10 together with a ticket. On the other hand, in the case where the target FM station does not offer now-on-air, the CPU 35*a* transmits information showing that to the terminal unit 10.

If receiving the ticket and URL, the CPU 11 of the terminal unit 10 accesses the URL having the ticket, and receives the now-on-air. The CPU 11 displays the received now-on-air on the display 17. If receiving the information that the target FM station does not offer now-on-air, the CPU 11 displays that now-on-air is not offered on the display 17, for example.

Figure 9:
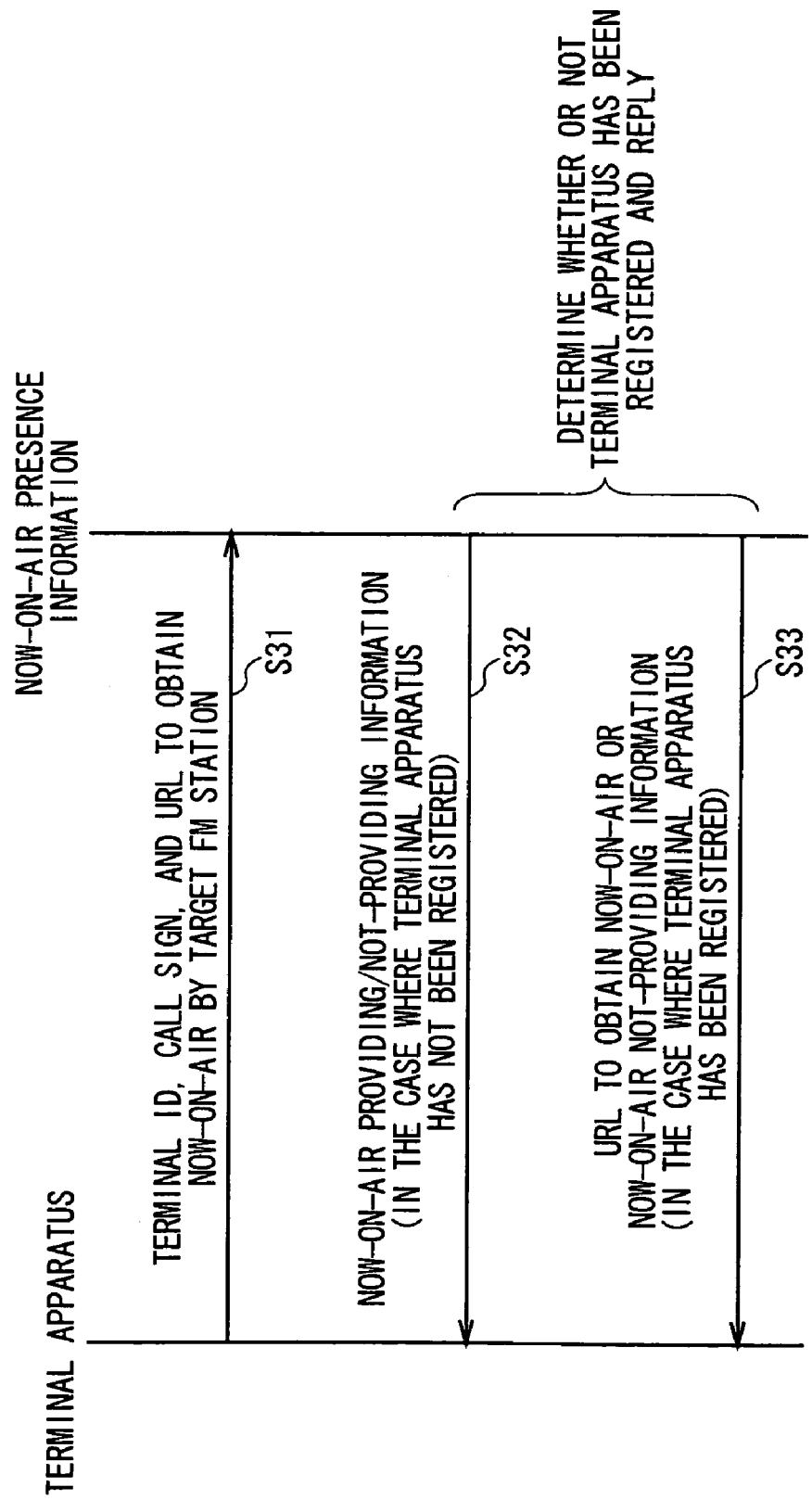
FIG. 9 is a sequence chart showing the flow of receiving of now-on-air in the case where the general service server determines yes/no of user registration.

Next, receiving of now-on-air in FM broadcasting in the case where the general service server 35 determines yes/no of user registration will be described with reference to a sequence chart. FIG. 9 is a sequence chart showing the flow of receiving of now-on-air in the case where a general service server determines yes/no of user registration.

In step S31, the CPU 11 of the terminal unit 10 transmits the call sign of the FM station being listened by the user, and the terminal ID in the case where it has been stored in the HDD 21. And also, the CPU 11 transmits a request signal for the URL to obtain now-on-air by the target FM station.

The CPU 35*a* of the general service server 35 determines whether or not the user has been made the user registration, by whether or not the terminal ID was transmitted from the terminal unit 10. In step S32, if it is determined that the user has not been made the user registration, the CPU 35*a* transmits information that whether or not the target FM station offers now-on-air to the terminal unit 10.

Note that, if the target FM station offers now-on-air, the CPU 11 of the terminal unit 10 displays an entry guide on the display 17, and if it does not offer now-on-air, the CPU 11 does not display the entry guide on the display 17.

In step S33, if it is determined that the user made the user registration, the CPU 35*a* transmits the URL to obtain now-on-air to the terminal unit 10 together with a ticket. On the other hand, if the target FM station does not offer now-on-air, the CPU 35*a* transmits the information that the target FM station does not offer now-on-air to the terminal unit 10.

Note that, if receiving the ticket and URL, the CPU 11 of the terminal unit 10 accesses the URL having the ticket, and receives the now-on-air. The CPU 11 displays the received now-on-air on the display 17. If receiving the information that the target FM station does not offer now-on-air, the CPU 11 displays that now-on-air is not offered on the display 17, for example.

In this manner, when the user made the user registration, the terminal unit 10 stores the terminal ID in the ROM 13 or the HDD 21, and determines whether or not the user has been registered by user registration with the terminal unit 10 by detecting whether or not the terminal ID has been stored in the ROM 13 or the HDD 21. Then, in accordance with the detection result, the terminal unit 10 selectively transmits either one of a request signal that requests now-on-air, and a request signal that requests the information showing whether or not a service providing now-on-air is available, to the general service server 35. If the user has been registered by the user registration, the general service server 35 transmits now-on-air to the terminal unit 10, and if the user has not been registered by user registration, the general service server 35 transmits information showing whether or not the broadcasting station being listened by the user offers now-on-air to the terminal unit 10. In the case where the user has not been registered by user registration, if the broadcasting station being listened by the user offers now-on-air, the terminal unit 10 displays an entry guide on the display 17, and if it does not offer, the terminal unit 10 does not display the entry guide on the display 17. Thereby, the terminal unit 10 can notify the user of whether or not the target broadcasting station offers now-on-air. Thus, in the case where the user has not been registered by user registration, the user becomes possible to receive related information about contents being offered, by viewing the entry guide displayed in the terminal unit 10 and do the procedure of entry.

In this connection, as the information showing whether or not the now-on-air is offered that is transmitted by the general service server 35, if it is offered, a message or a sound that shows being offered will be used. If it is not offered, a simple blank message, a message or a sound that shows not being offered, or the like will be used.

Note that, in this first embodiment, it has dealt with the case where if the terminal ID has not been stored in the HDD 21 of the terminal unit 10, the above terminal unit 10 transmits a request signal to request the information showing whether or not a service providing now-on-air is offered to the general service server 35. However, the present invention is not only limited to this but also by that the information to be an entry guide has been previously stored in the HDD 21, when the terminal ID has not been stored, this information to be the entry guide may be displayed on the display 17.

In this connection, as the information to be the entry guide, a message for promoting entry, a sound for promoting entry, or the like will be used. If it is the sound for promoting entry, the sound is emitted from the speaker 25 of the terminal unit 10.

(3) Second Embodiment

As a second embodiment, an embodiment of a system in which single sign on is realized by that a general service server 35 and a broadcasting station server 32 performs authentication of user information (user ID, password, terminal ID, and the like) transmitted from the aforementioned terminal unit 10 will be described.

Note that, in this second embodiment, an example for performing steps S23 and S24 in FIG. 8 in the state where the terminal ID has been already registered in the terminal unit 10 will be described. However, the authentication method by the general service server 35 and the broadcasting station server 32 is similar also in the case where the terminal ID has not been registered in the terminal unit 10.

Figure 10:
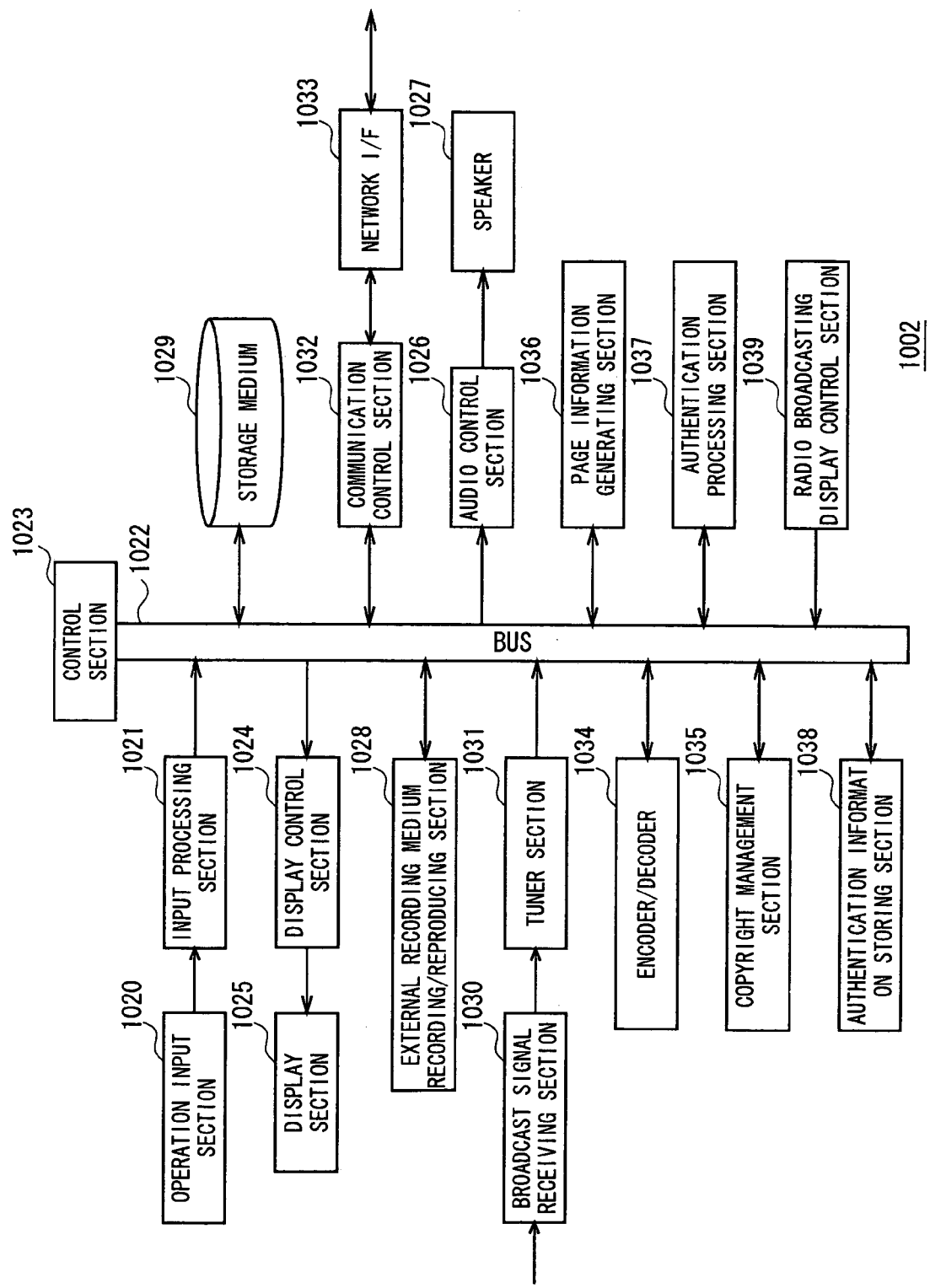
FIG. 10 is a block diagram showing the hardware configuration of a client terminal by functional circuit blocks according to a second embodiment of the present invention.

Furthermore, a client terminal 1002 in FIG. 10 in this second embodiment corresponds to the terminal unit 10 in FIG. 2 in the aforementioned first embodiment. A portal server 1003 in FIG. 11 corresponds to the general service server 35 in FIG. 2. And a radio broadcasting information distribution server 1006 in FIG. 12 corresponds to the broadcasting station server 32 in FIG. 2.

(3-1) Configuration of Client Terminal by Functional Circuit Blocks

The hardware configuration of the client terminal 1002 by functional circuit blocks will be described. As shown in FIG. 10, if an operation input section 1020 formed by various operation buttons provided on the surface of the casing or a remote controller (not shown) is operated by the user, the client terminal 1002 recognizes this in the above operation input section 1020, and transmits an operation input signal corresponding to the above operation to an input processing section 1021.

The input processing section 1021 converts the operation input signal supplied from the operation input section 1020 into a specified operation command, and transmits the command to a control section 1023 via a bus 1022.

The control section 1023 controls the operation of each of these circuits, based on an operation command and a control signal that are supplied from each circuit connected via the bus 1022.

A display control section 1024 performs digital-to-analog conversion on video data supplied via the bus 1022, and transmits thus obtained analog video signal to a display section 1025.

The display section 1025 is a display device such as a liquid crystal display, and is sometimes directly attached to the surface of the casing and is sometimes externally provided.

If a processing result by the control section 1023 or various video data is supplied as an analog video signal to the display section 1025 via the display control section 1024, an image based on the above analog video signal is displayed in the display section 1025.

An audio control section 1026 performs digital-to-analog conversion on audio data supplied via the bus 1022, and transmits thus obtained analog audio signal to a speaker 1027. The speaker 1027 emits a sound based on the analog audio signal supplied from the audio control section 1026.

An external recording medium recording/reproducing section 1028 is a recording/reproducing section for reading contents data recorded in an external recording medium such as a CD, and a memory stick (registered trademark) in that a flash memory is contained in an outer case and reproducing it, or for recording contents data to be recorded in the above external recording medium.

If reading video data from an external recording medium as contents data, the external recording medium recording/reproducing section 1028 supplies the above read video data to the display control section 1024 via the bus 1022.

The display control section 1024 converts the video data that was read from the external recording medium as contents data by the external recording medium recording/reproducing section 1028 into an analog video signal, and supplies the signal to the display section 1025.

On the other hand, if reading audio data from an external recording medium as contents data, the external recording medium recording/reproducing section 1028 supplies the above read audio data to the audio control section 1026 via the bus 1022.

The audio control section 1026 converts the audio data that was read from the external recording medium as contents data by the external recording medium recording/reproducing section 1028 into an analog audio signal, and supplies the signal to the speaker 1027.

Further, the control section 1023 can transmit contents data that was read from an external recording medium by the external recording medium recording/reproducing section 1028 to a storage medium 1029 in the client terminal 1002 via the bus 1022, so that the above contents data can be stored in the storage medium 1029 (hereinafter, storing contents data in the storage medium 1029 as the above is also referred to as ripping).

Then, if video data such as image data and motion picture data is read from the storage medium 1029 as contents data, the control section 1023 supplies the above read video data to the display control section 1024 via the bus 1022.

If audio data such as sound data is read from the storage medium 1029 as contents data, the control section 1023 supplies the above read audio data to the audio control section 1026 via the bus 1022.

In addition to this, the control section 1023 also can read music data from the storage medium 1029 and can transfer the read data to the external recording medium recording/reproducing section 1028, so that the music data can be recorded in an external recording medium by the above external recording medium recording/reproducing section 1028.

A broadcast signal receiving section 1030 receives a radio broadcast wave transmitted from each radio station, and supplies it to a tuner section 1031.

The tuner section 1031 extracts a radio broadcast signal at a broadcast frequency corresponding to the radio station that was specified for example via the operation input section 1020 from the radio broadcast waves received via the broadcast signal receiving section 1030, performs predetermined receiving processing on the extracted signal, and transmits thus obtained audio data to the audio control section 1026 via the bus 1022, under the control of the control section 1023.

The audio control section 1026 converts the audio data supplied from the tuner section 1031 into an analog audio signal and transmits the signal to the speaker 1027, so that the sound of the radio program broadcasted by the radio station is emitted from the above speaker 1027. Thus, the user can listen to the sound of the radio program.

Furthermore, the control section 1023 can transmit the audio data obtained in the tuner section 1031 to the storage medium 1029 so as to store the data, so that also the sound of the radio program can be recorded.

Further, the control section 1023 can connect the client terminal 1002 to a specified network sequentially via a communication control section 1032 and a network interface 1033, and can access the portal server 1003, a service provision server (for example, a radio broadcasting information distribution server 1006 that will be described later) and the like on the above network NT1000. Thereby, various information and various data can be transmitted/received to/from the portal server 1003, the service provision server, and the like.

An encoder/decoder section 1034 decodes the compressively-coded contents data that was received from the network sequentially via the network interface 1033 and the communication control section 1032, or the compressively-coded contents data that was read from the storage medium 1029 and an external recording medium, and transmits the decoded data to the display control section 1024 and the audio control section 1026.

Further, the encoder/decoder section 1034 compressively codes the contents data that has not been compressively-coded and was read from an external recording medium, audio data supplied from the tuner section 1031, or the like, and transmits the above compressively-coded contents data to the storage medium 1029.

Thus, the contents data compressively coded in the encoder/decoder section 1034 is stored in the storage medium 1029, under the control of the control section 1023.

A copyright management section 1035 generates copyright management information that corresponds to the contents data downloaded from the network sequentially via the network interface 1033 and the communication control section 1032, and copyright management information that corresponds to the contents data read from an external recording medium by the external recording medium recording/reproducing section 1028.

The copyright management information generated in the copyright management section 1035 is registered in the storage medium 1029 in association with the contents data, under the control of the control section 1023.

Further, when the contents data associated with copyright management information is checked out between the storage medium 1029 and a specified external recording medium, and when the contents data associated with the above copyright management information is checked in between the above specified external recording medium and the storage medium 1029, the copyright management section 1035 properly updates the contents of the copyright management information corresponding to the above contents data. Thereby, the copyright for the contents data is protected.

A page information generating section 1036 interprets page information such as an extensible markup language (XML) file, and a hypertext markup language (HTML) file, received from the network sequentially via the network interface 1033 and the communication control section 1032, generates video data to be displayed in the display section 1025, and transmits the above generated video data to the display control section 1024.

An authentication processing section 1037 performs authentication processing such as transmitting authentication information to the portal server 1003, the service provision server, and the like on the network connected via the network interface 1033, sequentially via the communication control section 1032 and the network interface 1033.

An authentication information storing section 1038 stores authentication information that is required when the authentication processing section 1037 accesses the portal server 1003, the service provision server, and the like.

A radio broadcasting display control section 1039 transmits a request signal to request radio broadcasting information about the radio broadcasting being received now for listening by the user, to a radio broadcasting information distribution server 1006 being one of the service provision servers that corresponds to the radio station broadcasting the above radio broadcasting being received, sequentially via the communication control section 1032 and the network interface 1033.

As a result, the radio broadcasting display control section 1039 receives the radio broadcasting information transmitted from the radio broadcasting information distribution server 1006 on the network, sequentially via the network interface 1033 and the communication control section 1032, and transmits the above received radio broadcasting information to the display control section 1024. Thereby, the radio broadcasting information composed of the program title of the radio program being received now, the title and the artist name of the above musical composition being received, and the like, (that corresponds to the related information in the aforementioned first embodiment), is displayed in the display section 1025.

(3-2) Configuration of Portal Server

Figure 11:
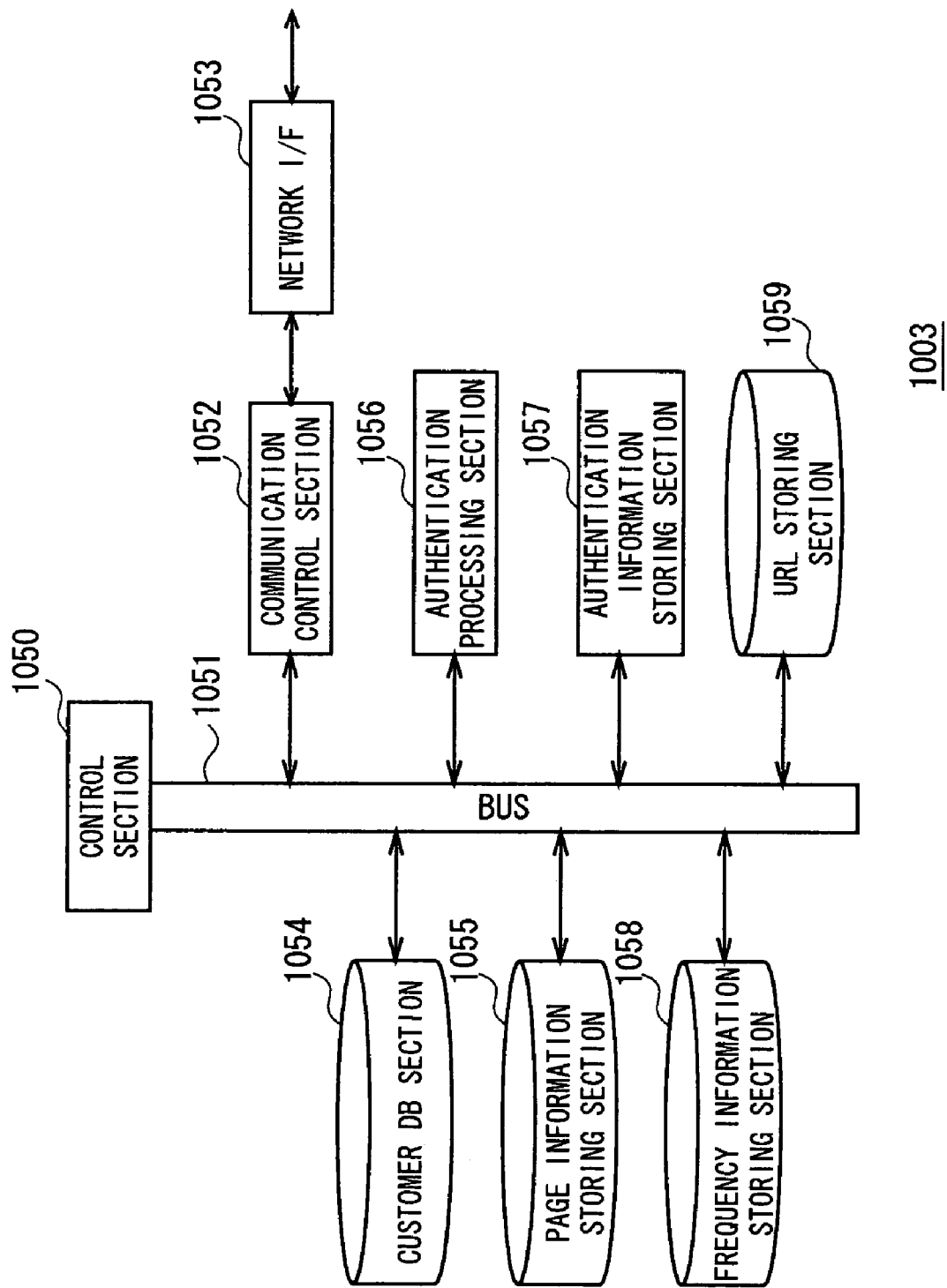
FIG. 11 is a block diagram showing the hardware configuration of a portal server by functional circuit blocks.

Next, the hardware configuration of the portal server 1003 serving as an authentication server by functional circuit blocks will be described, with reference to FIG. 11. A control section 1050 in the portal server 1003 controls the operation of each circuit connected via a bus 1051.

A communication control section 1052 transmits/receives various information to/from the client terminal 1002, the service provision server, and the like, via a network interface 1053, under the control of the control section 1050.

In a customer database section 1054, user identification (ID) information and password information about the user who already completed a contract with the administrator dealer of this system has been registered in association with each other, as customer information.

In a page information storing section 1055, page information managed by the administrator dealer of this system or the like has been stored.

Note that, the page information is described by a language such as the XML, and includes uniform resource locator (URL) information for accessing the service provision server, and the like.

If user ID information and password information transmitted from the client terminal 1002 is received sequentially via the network interface 1053 and the communication control section 1052, as user authentication processing, an authentication processing section 1056 confirms whether or not the above received user ID information and password information has been registered in the customer database section 1054 as customer information.

Then, if the user authentication processing is finished, the authentication processing section 1056 issues portal authentication result information showing the result of the above user authentication processing (authentication session ID information that will be described later), and temporarily stores the above issued portal authentication result information in an authentication information storing section 1057.

At this time, as the result of the user authentication processing by the authentication processing section 1056, if the user is authenticated as a legal user, the control section 1050 transmits page information about a page for contractor that has been stored in the page information storing section 1055, together with the portal authentication result information, to the client terminal 1002 sequentially via the communication control section 1052 and the network interface 1053.

Note that, as the result of the user authentication processing by the authentication processing section 1056, when the user was not authenticated as a legal user, the control section 1050 may transmit authentication error information, together with authentication failure notification page information showing the failure of the authentication stored in the page information storing section 1055, to the client terminal 1002 sequentially via the communication control section 1052 and the network interface 1053.

Further, as a result that authentication processing of the user was performed from the service provision server or the like, if portal authentication result information (an authentication ticket that will be described later) obtained and transmitted from the client terminal 1002 of the above user's is received sequentially via the network interface 1053 and the communication control section 1052, the authentication processing section 1056 compares the above received portal authentication result information with the portal authentication result information corresponding to the above user temporarily stored in the authentication information storing section 1057.

As authentication processing of the portal authentication result information received from the service provision server or the like, the authentication processing section 1056 performs confirmation processing for confirming whether or not to be regular portal authentication result information, and returns confirmation result information showing the confirmation result to the above service provision server or the like, sequentially via the communication control section 1052 and the network interface 1053.

In a frequency information storing section 1058, an area code such as a zip code capable of specifying an area, frequency information showing the broadcast frequency of radio broadcasting that can be received in the area shown by that area code, the name of a radio station broadcasting the above radio broadcasting (hereinafter, this is referred to as a radio station name), and a call sign being identification information that is unique to each radio station have been stored in association with each other.

In a URL storing section 1059, the call sign of each radio station for radio broadcasting, and URL information by which on a radio program being broadcasted now provided by the radio station corresponding to the above call sign, radio broadcasting information composed of the program title of the above radio program, the title of the musical composition being on air now in that radio program, and the like, (hereinafter, this is specially referred to as now-on-air information) can be obtained have been stored in association with each other.

Figure 12:
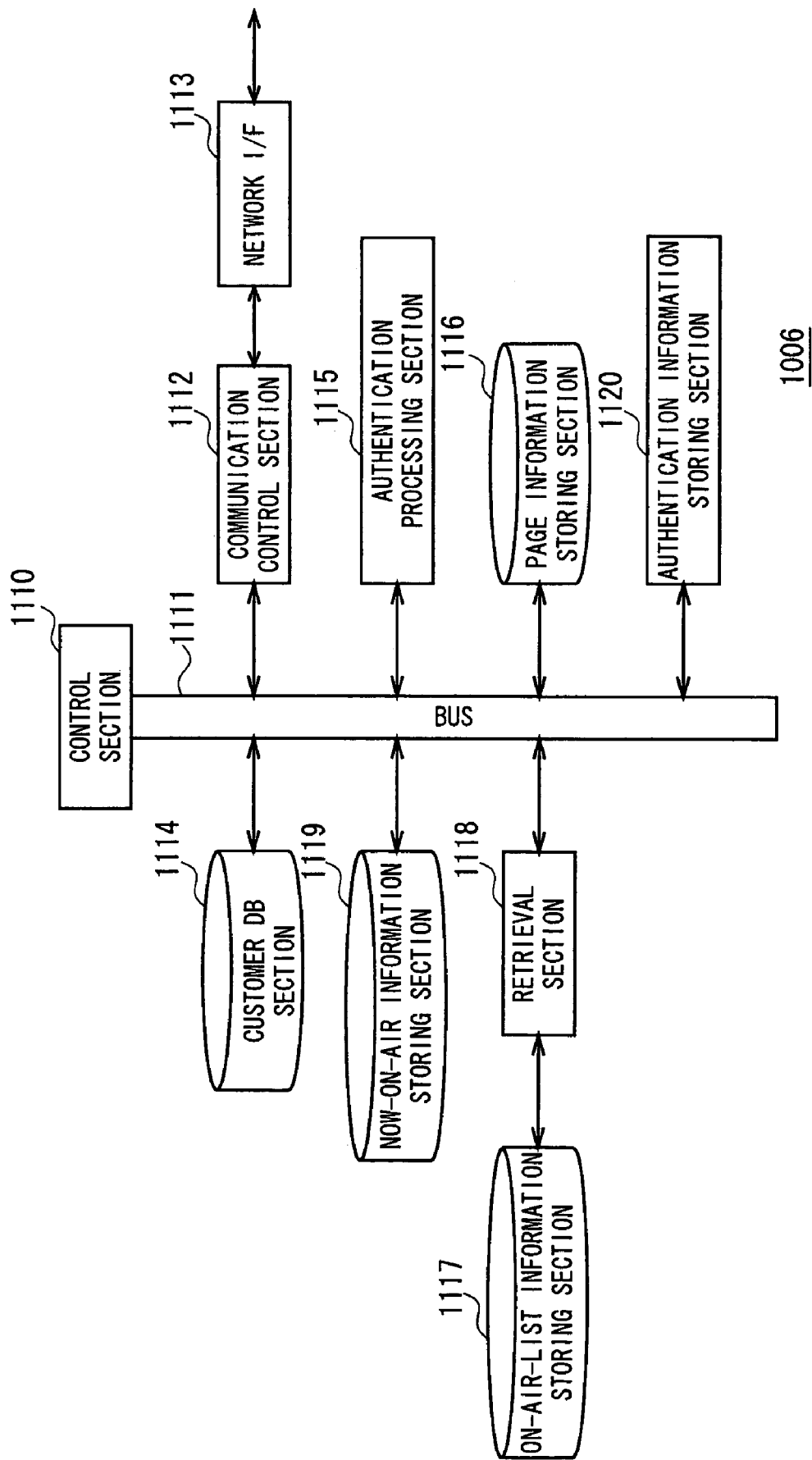
FIG. 12 is a block diagram showing the hardware configuration of a radio broadcasting information distribution server by functional circuit blocks.

(3-3) Configuration of Radio Broadcasting Information Distribution Server by Functional Circuit Blocks Next, the hardware configuration of the radio broadcasting information distribution server 1006 by functional circuit blocks that is one of service provision servers will be described with reference to FIG. 12. A control section 1110 in the radio broadcasting information distribution server 1006 controls the operation of each circuit connected via a bus 1111.

A communication control section 1112 transmits/receives various information to/from the client terminal 1002, the portal server 1003, and the like, via a network interface 1113, under the control of the control section 1110.

In a customer database section 1114, user ID information and password information about the user who already completed a contract with the administrator dealer of the radio broadcasting information distribution server 1006 has been registered in association with each other, as customer information. However, in the case where an authentication processing section 1115 has a function to perform authentication processing of the user based on the portal authentication result information issued by the portal server 1003 that was transmitted from the client terminal 1002, the customer database section 1114 may not be provided.

In a page information storing section 1116, page information about a page for on-air-list information distribution managed by the radio broadcasting information distribution server 1006 and to be used to obtain radio broadcasting information concerning the radio programs that were already broadcasted by the radio station corresponding to the above radio broadcasting information distribution server 1006 (hereinafter, this is specially referred to as on-air-list information), or the like, has been stored.

In this connection, the page information about a page for on-air-list information distribution is described by a language such as the XML, and in which entering boxes for making the user using the client terminal 1002 enter broadcasting time and date information, the program title, and the like of a radio program as a search key for the on-air-list information wanted to obtain are provided.

In the on-air-list information storing section 1117, on-air-list information created by listing the program title, the program broadcasting starting time, the program broadcasting ending time, and the like of the radio programs that were already broadcasted by the radio station corresponding to the radio broadcasting information distribution server 1006, and the title, the artist name, the musical composition broadcasting starting time, and the like of the musical compositions that were broadcasted in the above radio programs has been stored.

Then, if a page information acquisition request signal that requests page information about a page for on-air-list information distribution that was transmitted from the client terminal 1002 is received sequentially via the network interface 1113 and the communication control section 1112, the control section 1110 transmits page information about a page for on-air-list information distribution stored in the page information storing section 1116 to the client terminal 1002 sequentially via the communication control section 1112 and the network interface 1113, according to the above received page information acquisition request signal.

As a result, an on-air-list information request signal in which a search key for on-air-list information search wanted to obtain entered on the page information about a page for on-air-list information distribution has been stored and that requests to download the on-air-list information is transmitted from the client terminal 1002. Thereby, if the on-air-list information request signal is received sequentially via the network interface 1113 and the communication control section 1112, a retrieval section 1118 extracts the search key from the above received on-air-list information request signal.

Then, the retrieval section 1118 retrieves a predetermined area part corresponding to the search condition shown by the above search key as the on-air-list information wanted to obtain, from all of the on-air-list information in the on-air-list information storing section 1117, based on the above search key.

The control section 1110 transmits the retrieved on-air-list information wanted to obtain to the client terminal 1002, sequentially via the communication control section 1112 and the network interface 1113.

On the other hand, in a now-on-air information storing section 1119, radio broadcasting information (now-on-air information) composed of the program title, the program broadcasting starting time, and the program broadcasting ending time of the radio program that is being broadcasted now by the radio station corresponding to the radio broadcasting information distribution server 1006, and the title, the artist name, the musical composition broadcasting starting time, and the like of the musical composition that is being broadcasted at the present time in the above radio program has been stored.

If user ID information and password information about the user using the client terminal 1002 that was transmitted from the client terminal 1002 together with a now-on-air information request signal for requesting to obtain now-on-air information is received sequentially via the network interface 1113 and the communication control section 1112, as user authentication processing, the authentication processing section 1115 confirms whether or not the above received user ID information and password information has been registered in the customer database section 1114 as customer information.

Further, as a user authentication method different from the user authentication processing using the user ID information and password information, the authentication processing section 1115 receives portal authentication result information issued in the portal server 1003 that was transmitted from the client terminal 1002 (an authentication ticket that will be described later) sequentially via the network interface 1113 and the communication control section 1112, and transmits the above received portal authentication result information to the portal server 1003 sequentially via the communication control section 1112 and the network interface 1113.

Then, the authentication processing section 1115 receives confirmation result information returned as a result that authentication processing of the portal authentication result information (that is, the aforementioned confirmation processing) was performed responding to the transmission of the portal authentication result information to the portal server 1003, from the above portal server 1003 sequentially via the network interface 1113 and the communication control section 1112, and confirms whether or not the user is a regular user who already completed a contract with the administrator dealer of the music related service provision system 1000, based on the above received confirmation result information.

In this manner, if the user authentication processing is finished, the authentication processing section 1115 issues server authentication result information showing the result of that user authentication processing (service session ID information that will be described later).

At this time, as the result of the user authentication processing by the authentication processing section 1115, if the user is authenticated as a regular user, the control section 1110 transmits now-on-air information stored in the now-on-air information storing section 1119, together with the server authentication result information, to the client terminal 1002 sequentially via the communication control section 1112 and the network interface 1113.

On the contrary, as the result of the user authentication processing by the authentication processing section 1115, if the user was not authenticated as a regular user, the control section 1110 transmits authentication error information, together with authentication failure notification page information showing the failure of the authentication stored in the page information storing section 1116, to the client terminal 1002 sequentially via the communication control section 1112 and the network interface 1113.

In this manner, when the user requested to obtain now-on-air information, if the above user is authenticated as a regular user, the control section 1110 distributes the now-on-air information. However, if the user cannot be authenticated as a regular user, the control section 1110 forbids the user to receive a radio broadcasting information distribution service provided by the radio broadcasting information distribution server 1006, such as a now-on-air information distribution service.

By the way, in an authentication information storing section 1120, server authentication result information issued by the authentication processing section 1115 is temporarily stored, and also various authentication information that is required to perform user authentication processing of the user using the client terminal 1002 by the above authentication processing section 1115 has been stored.

(3-4) Summary of Processing in Each Server

Figure 13:
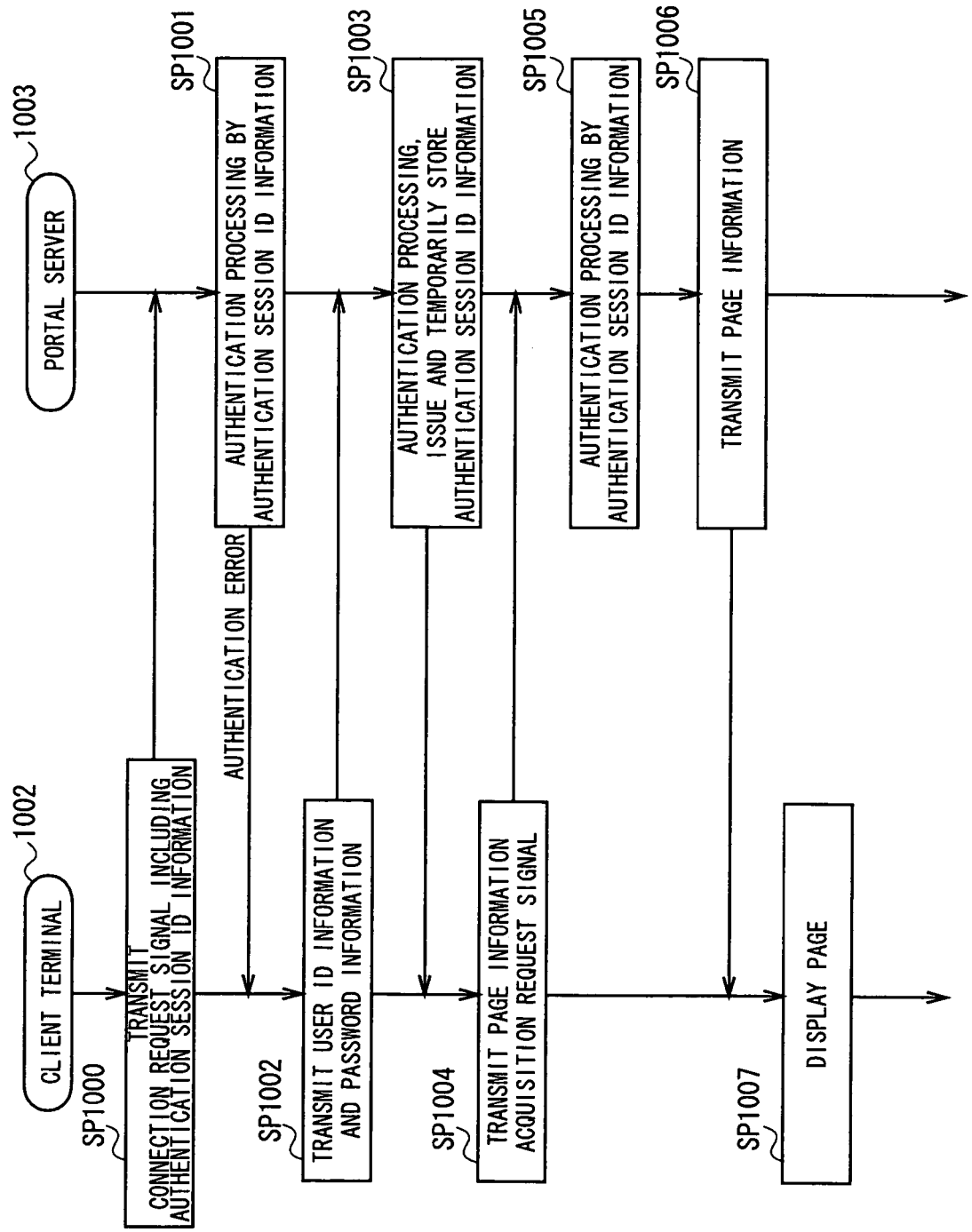
FIG. 13 is a sequence chart showing a user authentication processing procedure between the client terminal and the portal server.

Next, a summary of processing performed between the client terminal 1002 and the portal server 1003, and processing performed between the client terminal 1002 and each service provision server will be described, with reference to sequence charts shown in FIGS. 13 to 15.

(3-4-1) User Authentication Processing Procedure between Client Terminal 1002 and Portal Server 1003

First, a user authentication processing procedure performed between the client terminal 1002 and the portal server 1003 will be described with reference to FIG. 13.

In the client terminal 1002 of the user's contracting with the administrator dealer of this system, if an operation input signal recognized in the operation input section 1020 is converted into an operation command in the input processing section 1021 and the command is supplied, for instance, in response to that an operation to turn on the switch was performed to the client terminal 1002, or that a specified operation button in the operation input section 1020 was depressed by the user, the control section 1023 starts authentication request processing.

If the authentication request processing is started, in step SP1000, the control section 1023 generates a connection request signal storing authentication session ID information or the like that has been previously stored in the authentication information storing section 1038, and transmits the above generated connection request signal to the portal server 1003 sequentially via the communication control section 1032 and the network interface 1033.

In this connection, the authentication session ID information is identification information that will be issued by the portal server 1003 for identifying each communication connected state (that is, session) every time when communication between the client terminal 1002 and the portal server 1003 is connected to perform various processing such as user authentication processing.

Note that, as to the above authentication session ID information, on the use of it in user authentication processing or the like, a predetermined valid period based on the time when it was issued by the portal server 1003 (for example, approximately one minute) has been set.

Therefore, in the case where the client terminal 1002 that obtained the authentication session ID information from the portal server 1003 cannot present the authentication session ID information to the portal server 1003 within the valid period, it is determined that the communication connected state specified by the above authentication session ID information was cut off, by the portal server 1003.

Thereby, the portal server 1003 can prevent that the authentication session ID information issued in the past is illegally used by the user who does not contract with the administrator dealer of the music related service provision system 1 in the user authentication processing or the like.

The authentication session ID information temporarily stored in the authentication information storing section 1038 is ID information that was issued by the portal server 1003 when the communication between the client terminal 1002 and that portal server 1003 was connected in the past to perform user authentication processing or the like.

If a connection request signal is transmitted from the client terminal 1002, in response to this, in step SP1001, the control section 1050 in the portal server 1003 receives the connection request signal sequentially via the network interface 1053 and the communication control section 1052, and transmits authentication session ID information or the like stored in the above received connection request signal to the authentication processing section 1056.

The authentication processing section 1056 performs user authentication processing based on the authentication session ID information or the like received from the client terminal 1002 as the connection request signal, under the control of the control section 1050.

As a result, if the user using the above client terminal 1002 cannot be authenticated as a regular user by the authentication processing section 1056 because the valid period of the authentication session ID information or the like received from the client terminal 1002 has expired or the like, the control section 1050 transmits authentication error information showing an authentication error to the client terminal 1002 sequentially via the communication control section 1052 and the network interface 1053.

In step SP1002, if the authentication error information transmitted from the portal server 1003 is received sequentially via the network interface 1033 and the communication control section 1032, in response to this, the control section 1023 of the client terminal 1002 reads the user ID information, password information, terminal ID, and the like stored in the authentication information storing section 1038, and transmits the above read user ID information, password information, terminal ID, and the like to the portal server 1003 sequentially via the communication control section 1032 and the network interface 1033.

In step SP1003, the control section 1050 of the portal server 1003 receives the user ID information, password information, terminal ID, and the like transmitted from the client terminal 1002 sequentially via the network interface 1053 and the communication control section 1052, and transmits them to the authentication processing section 1056.

As user authentication processing, the authentication processing section 1056 detects whether or not these received user ID information, password information, terminal ID, and the like are included in customer information registered in the customer database section 1054, under the control of the control section 1050.

As a result, if the user using the client terminal 1002 is authenticated as a regular user, the authentication processing section 1056 issues authentication session ID information or the like for the current communication connected state between the client terminal 1002 and the portal server 1003, as portal authentication result information, under the control of the control section 1050, and temporarily stores the issued authentication session ID information or the like in the authentication information storing section 1057.

Then, the control section 1050 transmits the authentication session ID information or the like that the authentication processing section 1056 issued to the client terminal 1002, to the client terminal 1002 sequentially via the communication control section 1052 and the network interface 1053.

In step SP1004, the control section 1023 of the client terminal 1002 receives the authentication session ID information or the like transmitted from the portal server 1003 sequentially via the network interface 1033 and the communication control section 1032, and transmits the above received authentication session ID information or the like to the authentication processing section 1037.

The authentication processing section 1037 temporarily stores the received authentication session ID information or the like to the authentication information storing section 1038, under the control of the control section 1023.

Thereby, the control section 1023 transmits a page information acquisition request signal for requesting the portal server 1003 to supply page information, together with that authentication session ID information or the like received from the portal server 1003 and temporarily stored in the authentication information storing section 1038, to the portal server 1003 sequentially via the communication control section 1032 and the network interface 1033.

In step SP1005, the control section 1050 of the portal server 1003 receives the page information acquisition request signal and the authentication session ID information or the like that were transmitted from the client terminal 1002, sequentially via the network interface 1053 and the communication control section 1052, and transmits the above received authentication session ID information or the like to the authentication processing section 1056.

The authentication processing section 1056 performs user authentication processing by comparing the received authentication session ID information or the like with the authentication session ID information or the like that was issued to the client terminal 1002 and has been temporarily stored in the authentication information storing section 1057 in the aforementioned step SP1003, under the control of the control section 1050.

As a result, if the user using the client terminal 1002 is authenticated as a regular user, in step SP1006, the authentication processing section 1056 determines the page information acquisition request from the above client terminal 1002 as a legal request, and extends the valid period of the authentication session ID information or the like issued to the client terminal 1002.

At this time, the control section 1050 reads page information requested to obtain by the user from the page information storing section 1055, and transmits the above read page information, together with the authentication session ID information or the like of which the valid period was extended by the authentication processing section 1056, to the client terminal 1002 sequentially via the communication control section 1052 and the network interface 1053.

In step SP1007, the control section 1023 of the client terminal 1002 receives the page information transmitted from the portal server 1003 and the authentication session ID information or the like of which the valid period was extended, sequentially via the network interface 1033 and the communication control section 1032, transmits the above received page information to the page information generating section 1036, and transmits the authentication session ID information or the like of which the valid period was extended to the authentication processing section 1037.

The page information generating section 1036 generates video data about a page in which links to each service provision server are embedded, based on the page information supplied from the control section 1023, and transmits the above generated video data to the display control section 1024.

Thereby, the display control section 1024 performs digital-to-analog conversion on the video data supplied from the page information generating section 1036, and transmits thus obtained analog video signal to the display section 1025, so that the page of the portal server 1003 is displayed in the above display section 1025 as images based on the analog video signal.

Further, the authentication processing section 1037 temporarily stores the authentication session ID information or the like that was received from the portal server 1003 and of which the valid period was extended, in the authentication information storing section 1038, under the control of the control section 1023, so as to update it on the authentication information or the like before its valid period was extended. Thereby, the authentication session ID information or the like temporarily stored in the aforementioned step SP1004 is updated to the authentication session ID information of which the valid period was extended or the like.

(3-4-2) User Authentication Processing Procedure between Client Terminal 1002 and Service Provision Server Next, with reference to FIG. 14, user authentication processing performed between the client terminal 1002 and each service provision server will be described.

Practically, there is a case where plural service provision servers such as the radio broadcasting information distribution server 1006 and a trade server not shown are provided for each service to be provided. However, user authentication processing performed between them and the client terminal 2 will be performed in a similar procedure in any service provision server.

Therefore, each service provision server has a control section, an authentication processing section, a page information storing section, an authentication information storing section, a communication control section and a network interface that are respectively required to perform user authentication processing (for example, if it is a radio broadcasting information distribution server, it has a control section 1110, an authentication processing section 1115, a page information storing section 1116, an authentication information storing section 1116, a communication control section 1112 and a network interface 1113).

Further, in this user authentication processing, there is a case where it is performed by that the client terminal 1002 accesses each service provision server based on a link on page information obtained from the portal server 1003, and a case where it is performed by accessing each service provision server based on URL information previously registered as a bookmark or the like. However, in either of the cases, the processing will be performed in a similar procedure.

On the basis of them, the user authentication processing will be described in detail.

First, in step SP1010, the control section 1023 of the client terminal 1002 transmits service session ID information or the like read from the authentication information storing section 1038, together with a page information acquisition request signal that requests to obtain page information about a page for service provision (for example, if it is a radio broadcasting information distribution server, it is a page for on-air-list information distribution), to a service provision server sequentially via the communication control section 1032 and the network interface 1033, according to URL information embedded in the page information as a link, URL information already registered as a bookmark, or the like.

In this connection, the service session ID information is identification information that is issued to identify each communication connected state (that is, session) every time when communication between the client terminal 1002 and each service provision server is connected to perform various processing such as user authentication processing, by each service provision server accessed by the client terminal 1002.

Note that, as to the above service session ID information, similarly to the aforementioned authentication session ID information, on use of it in user authentication processing or the like, a predetermined valid period based on the time issued by each service provision server (for example, approximately one minute) has been set.

Therefore, if the client terminal 1002 that obtained service session ID information from each service provision server cannot present the service session ID information to the service provision server being the issuer within the valid period, it is determined that the communication connected state specified by the above service session ID information was cut off, by the service provision server being the issuer.

Thereby, each service provision server can prevent that the service session ID information issued in the past is illegally used in user authentication processing or the like, by the user who does not contract with the administrator dealer of the information provision system.

The service session ID information temporarily stored in the authentication information storing section 1038 is ID information that was issued by the accessed service provision server, when the communication between the client terminal 1002 and each service provision server was connected in the past to perform user authentication processing or the like.

In step SP1011, the control section of the service provision server receives a page information acquisition request signal and service session ID information or the like that were transmitted from the client terminal 1002, sequentially via the network interface and the communication control section, and transmits the above received service session ID information or the like to the authentication processing section.

The authentication processing section performs user authentication processing by comparing the received service session ID information or the like with the service session ID information or the like already temporarily stored in the authentication information storing section, under the control of the control section.

As a result, if the user using the above client terminal 1002 cannot be authenticated as a regular user because for instance, the valid period of the service session ID information received from the client terminal 1002 has already expired, the authentication processing section determines the acquisition request for the page information about a page for service provision from the client terminal 1002 as an illegal request.

Then, in this case, the control section transmits authentication error information showing an authentication error and a shop code as service identification information for identifying the service provision server, to the client terminal 1002 sequentially via the communication control section and the network interface.

In step SP1012, the control section 1023 of the client terminal 1002 receives the authentication error information and shop code transmitted from the service provision server, sequentially via the network interface 1033 and the communication control section 1032, and recognizes that the user was not authenticated as a regular user in the service provision server by the above received authentication error information, and also temporarily stores the shop code received from the service provision server in the authentication information storing section 1038.

Then, the control section 1023 generates an authentication ticket issuance request signal that requests to issue an authentication ticket to access the service provision server to the portal server 1003, and transmits the above generated authentication ticket issuance request signal, together with the shop code of the service provision server and the authentication session ID information or the like already received from the portal server 1003 and temporarily stored in the authentication information storing section 1038, to the portal server 1003 sequentially via the communication control section 1032 and the network interface 1033.

In step SP1013, the control section 1050 of the portal server 1003 receives the authentication ticket issuance request signal, the shop code and the authentication session ID information or the like that were transmitted from the client terminal 1002, sequentially via the network interface 1053 and the communication control section 1052, and transmits them to the authentication processing section 1056.

The authentication processing section 1056 performs user authentication processing by comparing the received authentication session ID information or the like with the authentication session ID information or the like already temporarily stored in the authentication information storing section 1057, under the control of the control section 1050.

As a result, if the user using the above client terminal 1002 cannot be authenticated as a regular user because for instance, the valid period of the authentication session ID information received from the client terminal 1002 has already expired, the authentication processing section 1056 determines that the authentication ticket issuance request from the client terminal 1002 is an illegal request.

In this case, the control section 1050 transmits authentication error information showing an authentication error to the client terminal 1002, sequentially via the communication control section 1052 and the network interface 1053.

On the contrary, if the user using the client terminal 1002 is authenticated as a regular user because for instance, the valid period of the authentication session ID information received from the client terminal 1002 has not been expired, the authentication processing section 1056 determines that the authentication ticket issuance request from the above client terminal 1002 is a legal request. In this case, the control section 1050 proceeds to step S1018 that will be described later.

In step SP1014, if the authentication error information transmitted from the portal server 1003 is received sequentially via the network interface 1033 and the communication control section 1032, the control section 1023 of the client terminal 1002 reads the user ID information, password information, terminal ID, and the like stored in the authentication information storing section 1038, and transmits them to the portal server 1003, sequentially via the communication control section 1032 and the network interface 1033.

In step SP1015, the control section 1050 of the portal server 1003 receives the user ID information, password information, terminal ID, and the like transmitted from the client terminal 1002, sequentially via the network interface 1053 and the communication control section 1052, and transmits them to the authentication processing section 1056.

The authentication processing section 1056 performs user authentication processing by detecting whether or not these received user ID information, password information, terminal ID, and the like are included in customer information registered in the customer database section 1054, under the control of the control section 1050.

As a result, if the user using the client terminal 1002 is authenticated as a regular user, the authentication processing section 1056 issues authentication session ID information to the current communication connected state between the client terminal 1002 and the portal server 1003 or the like as portal authentication result information, under the control of the control section 1050, and temporarily stores the issued authentication session ID information or the like in the authentication information storing section 1057.

Then, the control section 1050 transmits the authentication session ID information or the like issued to the client terminal 1002 by the authentication processing section 1056, to the client terminal 1002 sequentially via the communication control section 1052 and the network interface 1053.

In step SP1016, the control section 1023 of the client terminal 1002 receives the authentication session ID information or the like transmitted from the portal server 1003, sequentially via the network interface 1033 and the communication control section 1032, and temporarily stores the above received authentication session ID information or the like in the authentication information storing section 1038 by the authentication processing section 1037.

Then, the control section 1023 generates again an authentication ticket issuance request signal that requests to issue an authentication ticket to the portal server 1003, and transmits the above generated authentication ticket issuance request signal, together with the shop code already temporarily stored in the authentication information storing section 1038 and the authentication session ID information or the like temporarily stored at this time, to the portal server 1003 sequentially via the communication control section 1032 and the network interface 1033.

Here, in this embodiment, the shop code has been temporarily stored in the authentication information storing section 1038 in the client terminal 1002. However, the present invention is not only limited to this but when the processing in steps SP1012 to SP1016 is performed between the above client terminal 1002 and the portal server 1003, the shop code may be sequentially transmitted/received. Thereby, it is possible to transmit the shop code to the portal server 1003 in step SP1016 without temporarily storing the shop code in the authentication information storing section 1038 in the client terminal 1002.

In step SP1017, the control section 1050 of the portal server 1003 receives the authentication ticket issuance request signal, shop code, authentication session ID information, and the like transmitted from the client terminal 1002 sequentially via the network interface 1053 and the communication control section 1052, and transmits them to the authentication processing section 1056.

The authentication processing section 1056 performs user authentication processing by comparing the received authentication session ID information or the like with the authentication session ID information or the like already temporarily stored in the authentication information storing section 1057, under the control of the control section 1050.

As a result, if the user using the client terminal 1002 is authenticated as a regular user because for instance, the valid period of the authentication session ID information or the like received from the client terminal 1002 has not been expired, the authentication processing section 1056 determines that the authentication ticket issuance request from the above client terminal 1002 is a legal request.

Then, in the next step SP1018, the authentication processing section 1056 issues an authentication ticket that enables the client terminal 1002 to access the service provision server shown by the shop code, or the like, as portal authentication result information, based on the shop code and authentication ticket issuance request signal received from the client terminal 1002 in the aforementioned step SP1017, under the control of the control section 1050.

Here, the authentication processing section 1056 temporarily stores the issued authentication ticket or the like in the authentication information storing section 1057, and extends the valid period of the authentication session ID information or the like issued to the client terminal 1002, under the control of the control section 1050.

The control section 1050 transmits the authentication ticket or the like issued by the authentication processing section 1056, together with the authentication session ID information or the like of which the valid period was extended by the authentication processing section 1056, to the client terminal 1002 sequentially via the communication control section 1052 and the network interface 1053.

In step SP1019, the control section 1023 of the client terminal 1002 receives the authentication ticket or the like transmitted from the portal server 1003 and the authentication session ID information of which the valid period was extended or the like, sequentially via the network interface 1033 and the communication control section 1032, and transmits the above received authentication session ID information to the authentication processing section 1037.

The control section 1023 transmits the authentication ticket or the like received from the portal server 1003, together with an authentication request signal, to the service provision server sequentially via the communication control section 1032 and the network interface 1033.

Further, at this time, the authentication processing section 1037 temporarily stores the authentication session ID information or the like that was received from the portal server 1003 and of which the valid period was extended, in the authentication information storing section 1038, under the control of the control section 1023, by overwriting it on the authentication session ID information or the like before its valid period was extended. Thereby, the authentication session ID information or the like temporarily stored in the aforementioned step SP1016 is updated to the authentication session ID information of which the valid period was extended or the like.

In step SP1020, the control section of the service provision server receives an authentication request signal and an authentication ticket or the like that were transmitted from the client terminal 1002, sequentially via the network interface and the communication control section.

Then, the control section transmits the authentication ticket or the like received from the client terminal 1002, together with an authentication ticket confirmation request signal that requests to confirm the above authentication ticket or the like, to the portal server 1003 sequentially via the communication control section and the network interface.

In step SP1021, the control section 1050 of the portal server 1003 receives the authentication ticket confirmation request signal and authentication ticket or the like transmitted from the service provision server, sequentially via the network interface 1053 and the communication control section 1052, and transmits the above received authentication ticket confirmation request signal and authentication ticket or the like to the authentication processing section 1056.

The authentication processing section 1056 performs confirmation processing of the authentication ticket received from the service provision server, by comparing the received authentication session ID information or the like with the authentication ticket or the like already temporarily stored in the authentication information storing section 1057, according to the authentication ticket confirmation request signal, under the control of the control section 1050.

As a result, if the authentication ticket or the like received from the service provision server is confirmed as a legal authentication ticket or the like in the authentication processing section 1056, the control section 1050 transmits confirmation result information showing that the above authentication ticket or the like was confirmed as a legal authentication ticket or the like to the service provision server, sequentially via the communication control section 1052 and the network interface 1053.

In step SP1022, the control section of the service provision server receives the confirmation result information transmitted from the portal server 1003 sequentially via the network interface and the communication control section, and transmits the above received confirmation result information to the authentication processing section.

According to the confirmation result information, the authentication processing section issues service session ID information or the like to the current communication connected state between the client terminal 1002 and the service provision server, as server authentication result information, and temporarily stores the above issued service session ID information or the like in the authentication information storing section under the control of the control section.

The control section transmits this service session ID information or the like that the authentication processing section issued to the client terminal 1002 to the client terminal 1002 sequentially via the communication control section and the network interface.

In step SP1023, the control section 1023 of the client terminal 1002 receives the service session ID information or the like transmitted from the service provision server, sequentially via the network interface 1033 and the communication control section 1032. The above received service session ID information or the like is temporarily stored in the authentication information storing section 1038 by the authentication processing section 1037.

The control section 1023 transmits a page information acquisition request signal that requests page information about a page for service provision, together with the service session ID information or the like temporarily stored in the authentication information storing section 1038, to the service provision server sequentially via the communication control section 1032 and the network interface 1033.

In step SP1024, the control section of the service provision server receives the page information acquisition request signal and service session ID information or the like transmitted from the client terminal 1002, sequentially via the network interface and the communication control section, and transmits the above received service session ID information or the like to the authentication processing section.

The authentication processing section performs user authentication processing by comparing the received service session ID information or the like with the service session ID information or the like that was already issued to the client terminal 1002 in the aforementioned step SP1022 and has been temporarily stored in the authentication information storing section, under the control of the control section.

As a result, if the user using the client terminal 1002 is authenticated as a regular user because for instance, the valid period of the service session ID information or the like received from the client terminal 1002 has not been expired, the authentication processing section determines the acquisition request for the page information about a page for service provision from the above client terminal 1002 as a legal request.

At this time, the control section proceeds to the next step SP1025. In this step SP1025, the control section reads the page information about the page for service provision that was requested to obtain by the user from the page information storing section, and also extends the valid period of the service session ID information or the like issued to the client terminal 1002 in the authentication processing section.

Then, the control section transmits the page information about the page for service provision read from the page information storing section, together with the service session ID information of which the valid period was extended by the authentication processing section or the like, to the client terminal 1002 sequentially via the communication control section and the network interface.

In step SP1026, the control section 1023 of the client terminal 1002 receives the page information about the page for service provision and the service session ID information of which the valid period was extended or the like, that was transmitted from the service provision server, sequentially via the network interface 1033 and the communication control section 1032, transmits the above received page information about the page for service provision to the page information generating section 1036, and also transmits the received service session ID information or the like to the authentication processing section 1037.

The authentication processing section 1037 temporarily stores the received service session ID information or the like of which the valid period was extended, in the authentication information storing section 1038, under the control of the control section 1023, by overwriting it on the service session ID information or the like before its valid period was extended. Thereby, the service session ID information or the like temporarily stored in the aforementioned step SP1023 is updated to the service session ID information of which the valid period was extended or the like.

On the other hand, the page information generating section 1036 generates video data based on the page information about the page for service provision, and transmits the above generated video data to the display control section 1024.

The display control section 1024 performs digital-to-analog conversion on the video data supplied from the page information generating section 1036, and transmits thus obtained analog video signal to the display section 1025. Thus, the page for service provision is displayed in the above display section 1025 as an image based on the analog video signal.

Figure 15:
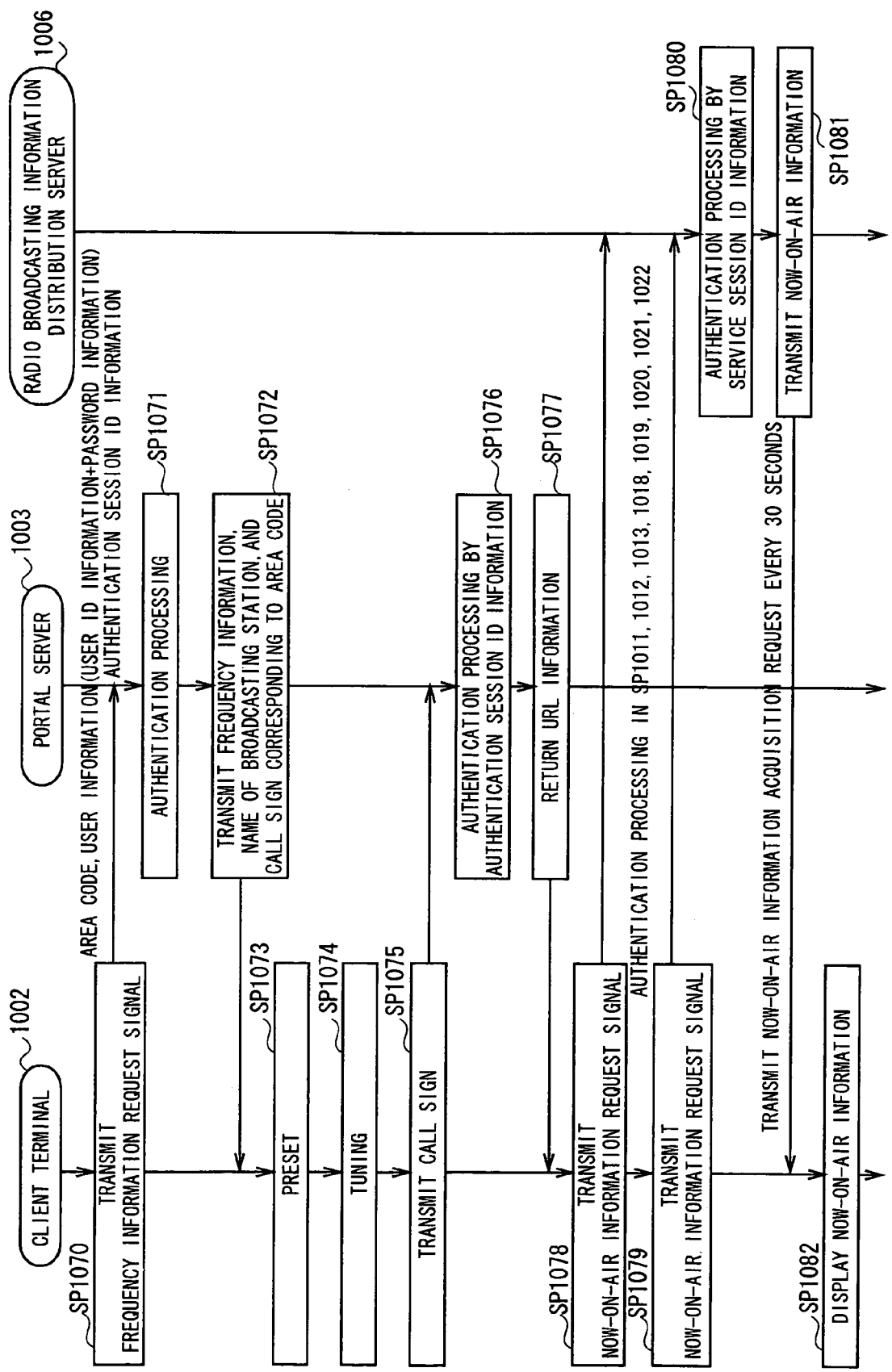
FIG. 15 is a sequence chart showing a radio broadcasting information (now-on-air information) distribution service providing processing procedure.

(3-4-3) Radio Broadcasting Information (Now-On-Air Information) Distribution Service Providing Processing Next, with reference to FIG. 15, a radio broadcasting information distribution service providing processing procedure when the client terminal 1002 especially receives the provision of a now-on-air information distribution service from the radio broadcasting information distribution server 1006 being one of service provision servers as a radio broadcasting information distribution service will be described.

However, the radio broadcasting information distribution server 1006 which provides now-on-air information is provided for each radio station (call sign).

Then, there is a case where in the initial state, URL information about the radio broadcasting information distribution server 1006 corresponding to each radio station has not been stored in the client terminal 1002.

Therefore, as to the radio broadcasting information distribution service providing processing procedure below, the case where the URL information about each radio broadcasting information distribution server 1006 is managed by the portal server 1003 every call sign of a radio station will be described as an example.

Further, in the above radio broadcasting information distribution service providing processing procedure, the case where when the client terminal 1002 requests the portal server 1003 to transmit frequency information showing the broadcasting frequency in order to automatically preset the broadcast frequency of each radio station, authentication session ID information or the like has not been temporarily stored in the authentication information storing section 1038 is assumed. Thus, the client terminal 1002 first transmits-user ID information, password information, a terminal ID, and the like to the portal server 1003.

In step SP1070, if an operating command to request to automatically preset the broadcast frequency of each radio station is inputted from the input processing section 1021, in response to this, the control section 1023 of the client terminal 1002 transmits a frequency information request signal that requests to obtain frequency information about receivable broadcasting frequency of each radio station, together with an area code entered by the user, the user ID information, password information, terminal ID and the like that have been stored in the authentication information storing section 1038, to the portal server 1003 sequentially via the communication control section 1032 and the network interface 1033.

In step SP1071, the control section 1050 of the portal server 1003 receives the frequency information request signal, area code, user ID information, password information, terminal ID, and the like that were transmitted from the client terminal 1002, sequentially via the network interface 1053 and the communication control section 1052, and transmits the user ID information, password information, terminal ID, and the like among of them, to the authentication processing section 1056.

The authentication processing section 1056 performs user authentication processing by comparing the received user ID information, password information, terminal ID, and the like with customer information registered in the customer database section 1054, under the control of the control section 1050.

As a result, if the authentication processing section 1056 authenticates the user using the client terminal 1002 as a regular user and determines that the frequency information acquisition request from the above client terminal 1002 is a legal request, the authentication processing section 1056 issues authentication session ID information or the like to the current communication connected state between the client terminal 1002 and the portal server 1003, and temporarily stores the above issued authentication session ID information or the like in the authentication information storing section 1057, under the control of the control section 1050.

At this time, the control section 1050 proceeds to the next step SP1072. In this step SP1072, the control section 1050 searches for frequency information, radio station name and a call sign that corresponds to the area code from the list of plural frequency information, radio station names and call signs in the frequency information storing section 1058, based on the area code received from the client terminal 1002, lists them, and reads it out.

The control section 1050 transmits the frequency information, radio station name and call sign thus listed and read from the frequency information storing section 1058, together with the authentication session ID information or the like that the authentication processing section 1056 issued to the client terminal 1002 in the aforementioned step SP1071, to the client terminal 1002 sequentially via the communication control section 1052 and the network interface 1053.

In step SP1073, the control section 1023 of the client terminal 1002 receives the list of the frequency information, radio station name and call sign, and the authentication session ID information or the like, that were transmitted from the portal server 1003, sequentially via the network interface 1033 and the communication control section 1032, and transmits the above authentication session ID information or the like received from the portal server 1003 to the authentication processing section 1037, and also transmits the list of the frequency information, radio station name and call sign to the display control section 1024.

The authentication processing section 1037 temporarily stores the received authentication session ID information or the like in the authentication information storing section 1038, under the control of the control section 1023.

On the other hand, the display control section 1024 transmits the list of the frequency information, radio station name and call sign supplied from the control section 1023 to the display section 1025, so that the list is displayed in the above display section 1025.

Further, the control section 1023 stores the frequency information, radio station name and call sign selected based on a select command inputted from the input processing section 1021 at this time, in the storage medium 1029 as presetting, and proceeds to the next step SP1074.

In step SP1074, the control section 1023 controls the tuner section 1031 to extract the radio broadcasting signal of radio broadcasting being broadcasted at a broadcast frequency corresponding to a tuning control command from radio broadcast waves, according to the tuning control command inputted from the input processing section 1021.

Thereby, the tuner section 1031 extracts the radio broadcasting signal being broadcasted at the broadcast frequency from among the radio broadcast waves received by the broadcast signal receiving section 30, performs predetermined receiving processing such as decoding to the extracted signal, and transmits thus obtained audio data to the audio control section 1026.

The audio control section 1026 converts the audio data supplied from the tuner section 1031 into an analog audio signal, and transmits the signal to the speaker 1027. Thus, the sound of the selected radio program is emitted from the above speaker 1027.

In step SP1075, the radio broadcasting display control section 1039 reads the call sign that has been stored in association with the frequency information showing a broadcast frequency corresponding to the aforementioned tuning control command from the storage medium 1029, under the control of the control section 1023, and transmits the above read call sign, together with the authentication session ID information (or it may be the user ID information and the password information) or the like already temporarily stored in the authentication information storing section 1038, to the portal server 1003 sequentially via the communication control section 1032 and the network interface 1033.

In step SP1076, the control section 1050 of the portal server 1003 receives the call sign and authentication session ID information (or the user ID information and password information) or the like transmitted from the client terminal 1002, sequentially via the network interface 1053 and the communication control section 1052, and transmits the above received authentication session ID, information (or the user ID information and password information) or the like to the authentication processing section 1056.

The authentication processing section 1056 performs user authentication processing by comparing the received authentication session ID information (or the user ID information and password information) or the like with the authentication session ID information (or the user ID information and password information) or the like already temporarily stored in the authentication information storing section 1057, under the control of the control section 1050.

As a result, if for example the authentication session ID information or the like received from the client terminal 1002 is before the valid period and the user who transmitted the call sign by using the above client terminal 1002 is authenticated as a regular user by the authentication processing section 1056, the control section 1050 proceeds to the next step SP1077.

In step SP1077, the control section 1050 retrieves URL information accoriated with the call sign from among plural URL information in the URL storing section 1059, based on the call sign received from the client terminal 1002.

Further, the control section 1050 extends the valid period of the authentication session ID information or the like issued to the client terminal 1002, by the authentication processing section 1056.

Then, the control section 1050 reads the retrieved URL information from the URL storing section 1059, and transmits the above read URL information, together with the authentication session ID information of which the valid period was extended by the authentication processing section 1056 or the like, to the client terminal 1002 sequentially via the communication control section 1052 and the network interface 1053.

In step SP1078, the control section 1023 of the client terminal 1002 receives the URL information and the authentication session ID information of which the valid period was extended or the like, that was transmitted from the portal server 1003, sequentially via the network interface 1033 and the communication control section 1032, and transmits the above received authentication session ID information or the like to the authentication processing section 1037 and also transmits the URL information to the radio broadcasting display control section 1039.

The authentication processing section 1037 temporarily stores the received authentication session ID information of which the valid period was extended or the like, in the authentication information storing section 1038, under the control of the control section 1023, by overwriting it on the authentication session ID information or the like before its valid period was extended. Thereby, the contents of the authentication session ID information or the like already temporarily stored in the above authentication information storing section 1038 are updated.

On the other hand, the radio broadcasting display control section 1039 temporarily stores the above URL information supplied from the control section 1023 in the storage medium 1029 or the like in association with the call sign stored in the storage medium 1029, under the control of the control section 1023.

Then, the radio broadcasting display control section 1039 transmits a now-on-air information request signal that requests to obtain now-on-air information, together with the service session ID information or the like that was already received from the radio broadcasting information distribution server 1006 and has been temporarily stored in the authentication information storing section 1038, to the radio broadcasting information distribution server 1006 sequentially via the communication control section 1032 and the network interface 1033, according to the URL information temporarily stored in the storage medium 1029 or the like, under the control of the control section 1023.

Figure 14:
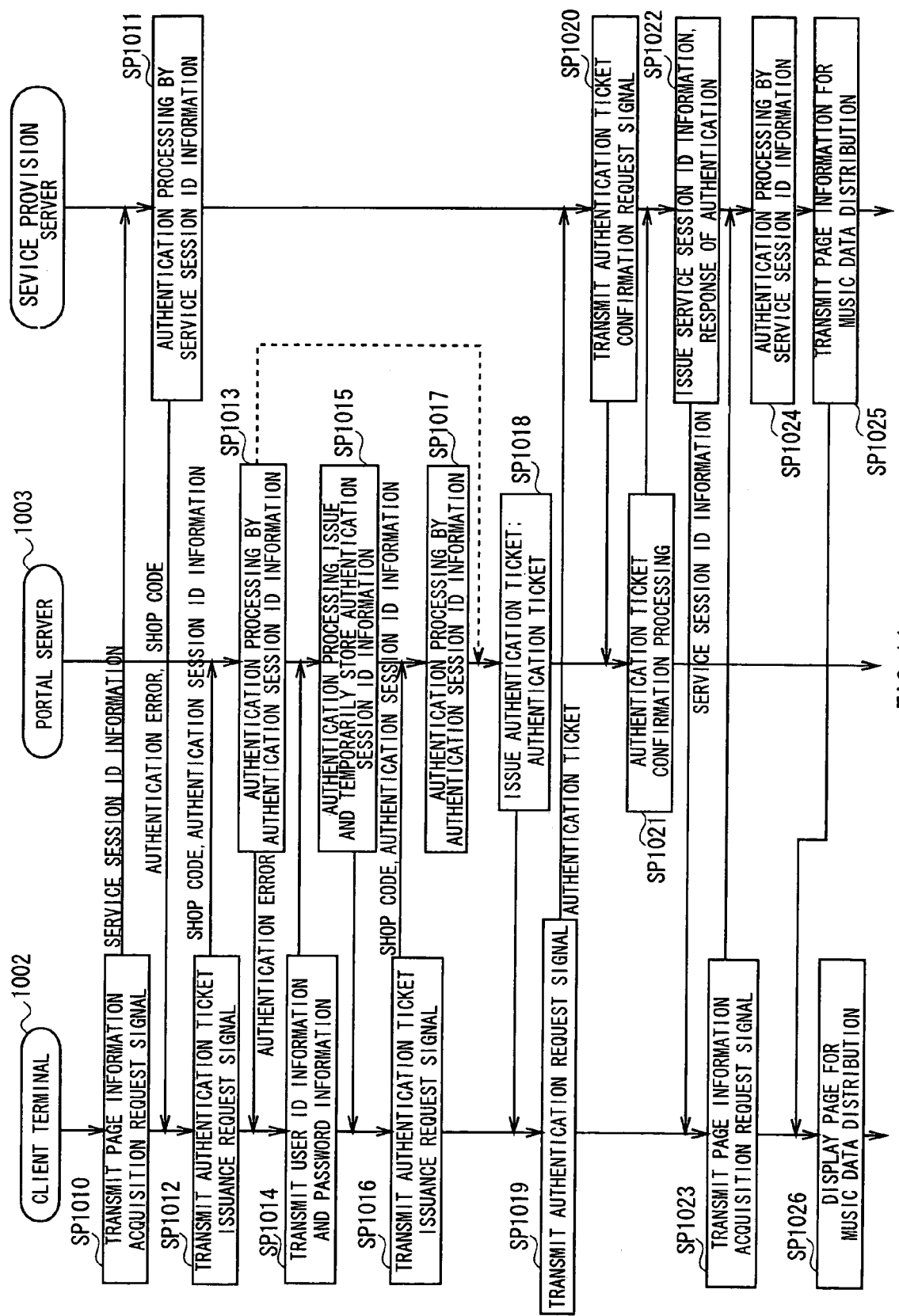
FIG. 14 is a sequence chart showing a user authentication processing procedure between the client terminal and a service provision server.

Here, in the above radio broadcasting information distribution service-providing processing procedure, processing for transmitting the now-on-air information request signal and the service session ID information or the like from the client terminal 1002 to the radio broadcasting information distribution server 1006 in step SP1078 corresponds to the processing in the aforementioned step SP1010 with reference to FIG. 14.

Therefore, in this radio broadcasting information distribution service providing processing procedure, following the processing in step SP1078, in the client terminal 1002, the radio broadcasting information distribution server 1006 and the portal server 1003, user authentication processing similar to the processing in steps SP1011-SP1013 and steps SP1018-SP1022 described above with reference to FIG. 14 is sequentially performed, and then the radio broadcasting display control section 1039 proceeds to the next step SP1079.

In step SP1079, the radio broadcasting display control section 1039 of the client terminal 1002 transmits again a now-on-air information request signal, together with the service session ID information or the like that was already received from the radio broadcasting information distribution server 1006 and has been temporarily stored in the authentication information storing section 1038, to the radio broadcasting information distribution server 1006 sequentially via the communication control section 1032 and the network interface 1033, according to the URL information temporarily stored in the storage medium 1029 or the like, under the control of the control section 1023.

In step SP1080, the control section 1110 of the radio broadcasting information distribution server 1006 receives the now-on-air information request signal and the service session ID information or the like that were transmitted from the client terminal 1002, sequentially via the network interface 1113 and the communication control section 1112, and transmits the above received authentication session ID information or the like to the authentication processing section 1115.

The authentication processing section 1115 performs user authentication processing by comparing the service session ID information or the like with the service session ID information or the like already temporarily stored in the authentication information storing section 1120, under the control of the control section 1110.

As a result, if authenticating the user using the client terminal 1002 as a regular user, the authentication processing section 1115 determines that the now-on-air information acquisition request from the above client terminal 1002 is a legal request.

If the user using the client terminal 1002 is authenticated as a regular user by the authentication processing section 1115, at this time, the control section 1110 makes the above authentication processing section 1115 extend the valid period of the service session ID information or the like issued to the client terminal 1002, and then proceeds to the next step SP1081.

In step SP1081, the control section 1110 reads now-on-air information from the now-on-air information storing section 1119, and transmits the above read now-on-air information, together with the service session ID information of which the valid period was extended by the authentication processing section 1115 or the like, to the client terminal 1002 sequentially via the communication control section 1112 and the network interface 1113.

In step SP1082, the control section 1023 of the client terminal 1002 receives the now-on-air information transmitted from the radio broadcasting information distribution server 1006, and the service session ID information of which the valid period was extended or the like, sequentially via the network interface 1033 and the communication control section 1032, and transmits the above received service session ID information or the like to the authentication processing section 1037, and also transmits the now-on-air information to the radio broadcasting display control section 1039.

The authentication processing section 1037 temporarily stores the received service session ID information of which the valid period was extended or the like, in the authentication information storing section 1038, under the control of the control section 1023, by overwriting it on the service session ID information or the like before its valid period was extended. Thereby, the contents of the service session ID information or the like already temporarily stored in the above authentication information storing section 1038 are updated.

The radio broadcasting display control section 1039 transmits the now-on-air information supplied from the control section 1023 to the display section 1025 via the display control section 1024. Thereby, the now-on-air information about the radio program by the radio broadcasting being received now is displayed in the above display section 1025.

After this, in the above radio broadcasting information distribution service providing processing procedure, the client terminal 1002 periodically repeats the now-on-air information acquisition request in step SP1079, and the radio broadcasting information distribution server 1006 receives that acquisition request from the client terminal 1002 and sequentially performs the processing of steps SP1080 and SP1081.

Thereby, in the client terminal 1002, the program title of the radio program being received now, the program broadcasting start time, the program broadcasting end time, the title and the artist name of the musical composition being broadcasted now in that radio program, the musical composition broadcasting start time, and the like can be momentarily updated as now-on-air information, and can be displayed in the display section 1025 in the client terminal 1002.

According to the above configuration, also in this second embodiment, the same effects as the aforementioned first embodiment can be obtained.

By the way, in the program modules (FIG. 5) in the terminal unit 10 that has been described in the aforementioned first embodiment, the HTTP message program 111 and the communicator program 112 are program modules that can realize a function similar to the communication control section 1032 (FIG. 10) of the client terminal 1002 described in this second embodiment.

The contents reproducing module 113 (FIG. 5) is a program module that can realize a function similar to the encoder/decoder section 1034 (FIG. 10).

Further, the copyright protection information management module 114 (FIG. 5) is a program module that can realize a function similar to the copyright management section 1035 (FIG. 10).

Further, the Internet radio channel selection/reproducing module 118 (FIG. 5) is a program module that can realize a function similar to the control section 1023 and the audio control section 1026 (FIG. 10).

Further, the musical composition purchase/reproducing module 119 (FIG. 5) is a program module that can realize a function similar to the control section 1023 and the audio control section 1026 (FIG. 10).

Further, the XML browser 151 (FIG. 5) is a program module that can realize a function similar to the input processing section 1021 and the page information generating section 1036 (FIG. 10).

Further, the hard disk contents controller 117, the database access module 115 and the contents data access module 116 (FIG. 5) are program modules that can realize a function similar to the control section 1023 (FIG. 10).

Further, the authentication library 131 in the library 130 (FIG. 5) is a program module that can realize a function similar to the authentication processing section 1037 and the authentication information storing section 1038 (FIG. 10).

Further, the clip library 132 in the library 130 (FIG. 5) is a program module that can realize a function similar to the control section 1023 (FIG. 10).

Further, the related information display module 120 (FIG. 5) is a program module that can realize a function similar to the radio broadcasting display control section 1039 (FIG. 10).

Further, the tuner selection and reproducing/recording module 121 (FIG. 5) is a program module that can realize a function similar to the control section 1023, the audio control section 1026 and the tuner section 1031 (FIG. 10).

Further, the audio user interface 152 (FIG. 5) is a program module that can realize a function similar to the input processing section 1021, the control section 1023 and the display control section 1024 (FIG. 10).

Further, the CD reproducing module 141 (FIG. 5) is a program module that can realize a function similar to the audio control section 1026 and the external recording medium recording/reproducing section 1028 (FIG. 10).

Further, the HDD reproducing module 142 (FIG. 5) is a program module that can realize a function similar to the control section 1023 and the audio control section 1026 (FIG. 10).

Therefore, also in the client terminal CT having the configuration by hardware circuit blocks in the aforementioned first embodiment, the CPU 11 can perform processing similar to the client terminal 1002 having the configuration by functional circuit blocks in this second embodiment, according to the various program modules.

Furthermore, in the general service server 35 (FIG. 6) in the aforementioned first embodiment, various programs to be stored in the RAM 35*b* and the hard disk drive 35*c* are appropriately selected depending on the function of the portal server 1003 (FIG. 11) in the aforementioned second embodiment. Thereby, the CPU 35*a* functions similarly to the control section 1050, the communication control section 1052, and the authentication processing section 1056 of the portal server 1003, according to the above various programs. And also the RAM 35*b* and the hard disk drive 35*c* can be used similarly to the customer database section 1054, the page information storing section 1055, the authentication information storing section 1057, the frequency information storing section 1058 and the URL storing section 1059, of the above portal server 1003.

(4) Other Embodiments

The various processing in the aforementioned embodiments may be provided by programs in that the contents of the above various processing are described. Also in this case, the aforementioned processing function is realized on a computer by executing the program on the computer. Further, this program may be recorded in a storage medium that can be read by a computer. As the above recording medium in this case, for example, there are a magnetic recording device (such as a hard disk device (HDD), a flexible disk (FD), and a magnetic tape), an optical disk (such as a DVD, a DVD-RAM, a CD-ROM, and a CD-R(recordable)/RW(rewritable)), a magneto-optical recording medium (such as a magneto-optical disk (MO)), a semiconductor memory, and the like.

This computer for executing the program stores the program recorded in a portable recording medium or the program transferred from a server computer in a memory in itself, for example. The computer reads the program from the memory in itself, and performs the processing according to the program. Note that, the computer also can directly read the program from a portable recording medium, and can perform the processing according to the program. Furthermore, the computer also can sequentially perform the processing according to the received program, every time when the program is transferred from a server computer.

Further, in the aforementioned first embodiment, it has dealt with the case where the terminal unit 10 serving as a communication apparatus is formed by the communication processing section 22 and the network interface 23 serving as transmission means, the audio data processing section 24 and the speaker 25 serving as notification means, and the display processing section 16 and the display device 17 serving as notification means and display means. However, the present invention is not only limited to this but also the terminal unit 10 may be formed by various circuit configuration other than them.

In the aforementioned second embodiment, it has dealt with the case where the client terminal 1002 serving as a communication apparatus is formed by the communication control section 1032 serving as transmission means and selection and transmission means, and the control section 1023 serving as storing means, detection means, and selection and transmission means. However, the present invention is not only limited to this but also a client terminal 1002 may be formed by various circuit configurations other than them.

Further, in the aforementioned embodiments, radio broadcasting broadcasted from a radio station is applied to the broadcasting that can be received by the terminal unit 10 serving as a user communication apparatus and the client terminal 1002. However, the present invention is not only limited to this but also the terminal unit 10 and the client terminal 1002 may receive Internet radio broadcasting and satellite radio broadcasting and may obtain related information (radio broadcasting information) about the broadcasting, or may receive television broadcasting broadcasted from a television broadcasting station and may obtain various broadcasting information or the like on television programs by the television broadcasting from a server on the network.

Furthermore, in the aforementioned embodiments, it has dealt with the case where the hardware circuit blocks, the functional circuit blocks and the program modules are mounted in the terminal unit 10 and the client terminal 1002. However, the present invention is not only limited to this but also they may be mounted in various terminals such as a cellular phone and a personal computer, other than the terminal unit 10 and the client terminal 1002. Provided that it is a terminal having these hardware circuit blocks, functional circuit blocks and program modules, processing similar to the aforementioned terminal unit 10 and client terminal 1002 can be realized.

INDUSTRIAL APPLICABILITY

The present invention can be utilized in a system for providing related information concerning a program that was broadcasted, for example, to a client terminal via a network.

EXPLANATION OF REFERENCE NUMERALS

1 . . . communication apparatus, 1*a* . . . transmission means, 1*b* . . . storage means, 1*c* . . . storage medium, 1*d* . . . detection means, 1*e* . . . transmission selecting means, 2 . . . external device, 10 . . . terminal unit, 11, 35*a* . . . CPU, 12 . . . bus, 13 . . . ROM, 14 . . . input processing section, 15 . . . operation input section, 16 . . . display processing section, 17 . . . display device, 19*a*, 19*b* . . . media drive, 20 . . . RAM, 21 . . . HDD, 22 . . . communication processing section, 23 . . . network interface, 24 . . . audio data processing section, 25 . . . speaker, 28 . . . infrared communication section, 30 . . . network, 31 . . . CD title information provision server, 32 . . . broadcasting station server, 33 . . . music distribution server, 34 . . . CD shop server, 35 . . . general service server, 36 . . . Internet radio server, 40 . . . remote controller, 41*a*-41*d* . . . direction key, 42 . . . determination key, 43*a*-43*c* . . . function selecting key, 44 . . . tool key, 45 . . . back key, 1002 . . . client terminal, 1003 . . . portal server, 1006 . . . radio broadcasting information distribution server.

The invention claimed is:

1. A communication apparatus, comprising:
   detection means for detecting whether or not externally input user personal information has been stored in a storage medium;
   communicative means for transmitting request information that requests related information about contents included in received broadcast information,
   the communicative means transmitting a transmission of available/unavailable request information identifying a broadcast station that broadcast the received broadcast information, if said detection means detects that said externally input user personal information is not stored in said storage medium,
   the communicative means receiving available/unavailable information in a reply to the transmission of said available/unavailable request information, the available/unavailable information showing whether or not an external device offers a service providing said related information about the contents,
   the communicative means transmitting said externally input user personal information to the external device to request a user registration in accordance with said available/unavailable information, if said detection means detects that said externally input user personal information is not stored in said storage medium, wherein
   said detection means stores said externally input user personal information in said storage medium, if said detection means detects that said externally input user personal information is not stored in said storage medium.

2. The communication apparatus according to claim 1, further comprising:
   notification means for notifying whether or not said external device offers the service providing said related information about the contents, based on said available/unavailable information.

3. The communication apparatus according to claim 2, further comprising:
   display means for displaying advertisement information to promote said user registration in accordance with said available/unavailable information.

4. The communication apparatus according to claim 2, wherein a URL showing advertisement information to promote said user registration is included in said available/unavailable information.

5. The communication apparatus according to claim 1, wherein said externally input user personal information includes at least name information corresponding to a name of said communication apparatus.

6. The communication apparatus according to claim 1, wherein the detection means stores said externally input user personal information in said storage medium upon a reception of registration completion information from said external device in response to the user registration.

7. The communication apparatus according to claim 1, wherein the transmission means transmits the request information, if the detection means detects that the externally input user personal information has been stored in the storage medium.

8. The communication apparatus according to claim 1, wherein the request information identifies the broadcast station.

9. A communication method implemented in a communication apparatus, the communication method comprising:
   detecting whether or not externally input user personal information has been stored in a storage medium;
   transmitting available/unavailable request information identifying a broadcast station that broadcast received broadcast information, if said externally input user personal information was not detected in said storage medium in said detecting;
   receiving available/unavailable information, showing whether or not an external device offers a service providing related information about contents included in the received broadcast information, in a reply to the transmitting said available/unavailable request information;
   transmitting, with the communication apparatus, said externally input user personal information to the external device to request a user registration in accordance with said available/unavailable information, if said externally input user personal information was not detected in said storage medium in said detecting;
   storing said externally input user personal information in said storage medium, if said externally input user personal information was not detected in said storage medium in said detecting; and
   transmitting request information that requests said related information about the contents.

10. The communication method according to claim 9, further comprising:
    displaying advertisement information to promote said user registration in accordance with said available/unavailable information.

11. The communication method according to claim 9, wherein a URL showing advertisement information to promote said user registration is included in said available/unavailable information.

12. The communication method according to claim 6, wherein said externally input user personal information includes at least name information corresponding to a name of said communication apparatus.

13. A non-transitory computer-readable storage medium including a communication program, wherein the communication program, when executed by a computer, makes the computer perform a method comprising:
- detecting whether or not externally input user personal information has been stored in a storage medium;
- transmitting available/unavailable request information that requests available/unavailable information showing whether or not an external device offers a service providing related information about contents included in received broadcast information, if said externally input user personal information was not detected in said storage medium in said detecting, the available/unavailable information identifying a broadcast station that broadcast the received broadcast information;
- receiving said available/unavailable information, showing whether or not said external device offers said service, in reply to the transmitting said available/unavailable request information;
- transmitting said externally input user personal information to the external device to request a user registration in accordance with said available/unavailable information, if said externally input user personal information was not detected in said storage medium in said detecting;
- storing said externally input user personal information in said storage medium, if said externally input user personal information was not detected in said storage medium in said detecting; and
- transmitting request information that requests said related information about the contents.

14. A communication apparatus, comprising:
- a processing unit configured to detect whether or not externally input user personal information has been stored in a storage medium; and
- a network interface configured to transmit a transmission of available/unavailable request information identifying a broadcast station that broadcast received broadcast information, if said externally input user personal information has not been stored in said storage medium,
- the network interface configured to receive available/unavailable information in a reply to the transmission of said available/unavailable request information, the available/unavailable information showing whether or not an external device offers a service providing related information about contents included in the received broadcast information,
- the network interface configured to transmit said externally input user personal information to the external device to request a user registration in accordance with said available/unavailable information, if said processing unit detects that said externally input user personal information is not stored in said storage medium,
- the network interface configured to transmit request information that requests said related information about the contents, wherein
- the processing unit stores said externally input user personal information in said storage medium, if said processing unit detects that said externally input user personal information is not stored in said storage medium.

* * * * *